US012309730B2

(12) United States Patent
Tsai et al.

(10) Patent No.: US 12,309,730 B2
(45) Date of Patent: May 20, 2025

(54) REPORTING USER EQUIPMENT SPECIFIC TIMING ADVANCE IN A NON-TERRESTRIAL NETWORK

(71) Applicant: SHARP KABUSHIKI KAISHA, Sakai (JP)

(72) Inventors: Hsin-Hsi Tsai, Taipei (TW); Chien-Chun Cheng, Taipei (TW); Heng-Li Chin, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 86 days.

(21) Appl. No.: 17/466,404

(22) Filed: Sep. 3, 2021

(65) Prior Publication Data

US 2022/0086780 A1    Mar. 17, 2022

Related U.S. Application Data

(60) Provisional application No. 63/077,439, filed on Sep. 11, 2020.

(51) Int. Cl.
*H04W 56/00* (2009.01)
*G01S 19/05* (2010.01)
(Continued)

(52) U.S. Cl.
CPC ........... *H04W 56/005* (2013.01); *G01S 19/05* (2013.01); *H04W 56/006* (2013.01); *H04W 74/0841* (2013.01); *H04W 84/06* (2013.01)

(58) Field of Classification Search
CPC ............. H04W 56/005; H04W 56/006; H04W 74/0841; H04W 84/06; G01S 19/05; H04B 7/1851
See application file for complete search history.

(56) References Cited

U.S. PATENT DOCUMENTS 11,812,473 B2 * 11/2023 Shrestha ........... H04W 56/0005
2012/0282969 A1 * 11/2012 Jiang ................. H04W 56/0045
455/517
(Continued)

FOREIGN PATENT DOCUMENTS

CN          103580794 A   *  2/2014
CN          111480358 A      7/2020
WO     WO-2021142633 A1  *  7/2021    ......... H04B 7/18513

OTHER PUBLICATIONS

3rd Generation Partnership Project; Technical Specification Group Radio Access Network; NR; Physical layer procedures for control (Release 16); 3GPP TS 38.213 V16.2.0 (Jun. 2020).
(Continued)

*Primary Examiner* — Mounir Moutaouakil
(74) *Attorney, Agent, or Firm* — ScienBiziP, P.C.

(57) ABSTRACT

A method for a user equipment (UE) in a non-terrestrial network (NTN) is provided. The method receives, from a base station (BS), an indication associated with a UE-specific timing advance (TA) report. The indication includes a value. The method initiates a random access (RA) procedure. The method then determines whether to transmit the UE-specific TA report based on the value of the indication. If the method determines that the value enables transmission of the UE-specific TA report, the method transmits, to the BS, the UE-specific TA report through the RA procedure.

12 Claims, 14 Drawing Sheets

(51) Int. Cl.
*H04W 74/0833* (2024.01)
*H04W 84/06* (2009.01)

(56) References Cited

U.S. PATENT DOCUMENTS

| | | | | |
|---|---|---|---|---|
| 2016/0309517 | A1* | 10/2016 | Park | H04W 56/0005 |
| 2019/0159149 | A1* | 5/2019 | Ryu | H04W 56/0045 |
| 2020/0107283 | A1* | 4/2020 | Ratasuk | H04L 27/2646 |
| 2020/0336227 | A1* | 10/2020 | Takeda | H04W 72/04 |
| 2021/0099965 | A1* | 4/2021 | Manolakos | G01S 13/878 |
| 2021/0289460 | A1* | 9/2021 | Medles | H04W 72/21 |
| 2022/0046566 | A1* | 2/2022 | Leng | H04B 7/1851 |
| 2022/0070811 | A1* | 3/2022 | Tripathi | H04W 56/006 |
| 2022/0330187 | A1* | 10/2022 | Cheng | H04W 56/004 |
| 2023/0117959 | A1* | 4/2023 | Tripathi | H04W 56/0045 370/328 |

OTHER PUBLICATIONS

3rd Generation Partnership Project; Technical Specification Group Radio Access Network; Physical layer procedures for shared spectrum channel access (Release 16); 3GPP TS 37.213 V16.2.0 (Jun. 2020).

3rd Generation Partnership Project; Technical Specification Group Radio Access Network; Solutions for NR to support non-terrestrial networks (NTN) (Release 16); 3GPP TR 38.821 V16.0.0 (Dec. 2019).

3rd Generation Partnership Project; Technical Specification Group Radio Access Network; NR; Radio Resource Control (RRC) protocol specification (Release 16); 3GPP TS 38.331 V16.0.0 (Mar. 2020).

3rd Generation Partnership Project; Technical Specification Group Radio Access Network; NR; NR and NG-RAN Overall Description; Stage 2 (Release 16); 3GPP TS 38.300 V16.2.0 (Jul. 2020).

3rd Generation Partnership Project; Technical Specification Group Radio Access Network; NR; Medium Access Control (MAC) protocol specification (Release 16); 3GPP TS 38.321 V16.1.0 (Jul. 2020).

3rd Generation Partnership Project; Technical Specification Group Radio Access Network; NR; Physical layer procedures for data (Release 16); 3GPP TS 38.214 V16.2.0 (Jun. 2020).

Asia Pacific Telecom, FGI, "Triggering of UE-specific TA report", R2-2103261, 3GPP TSG-RAN WG2 Meeting #113 bis electronic, Online, Apr. 12-Apr. 20, 2021.

MediaTek Inc., "Timing relationship enhancements for NR-NTN", R1-2005495, 3GPP TSG RAN WG1 Meeting #102e, Aug. 24-28, 2020.

InterDigital (email discussion Rapporteur), "Summary of [AT111][107][NTN] Pre-compensation and other MAC issues Phase 2", R2-2008214, 3GPP RAN WG2 Meeting #111e, Aug. 17-28, 2020.

Moderator (Ericsson): "Feature lead summary on timing relationship enhancements", 3GPP Draft; R1-2007074, 3GPP TSG-RAN WG1 Meeting #102-e, e-Meeting, Aug. 17-28, 2020 (Aug. 21, 2020).

* cited by examiner

1400 → Start an RA response window after the offset from an end of an RA preamble transmission of the RA procedure — 1402

1500 → Start an RA contention resolution timer after the offset from an end of an MSG3 transmission of the RA procedure — 1502

US 12,309,730 B2

REPORTING USER EQUIPMENT SPECIFIC TIMING ADVANCE IN A NON-TERRESTRIAL NETWORK

CROSS-REFERENCE TO RELATED APPLICATION(S)

The present application claims the benefit of and priority to U.S. Provisional Patent Application Ser. No. 63/077,439, filed on Sep. 11, 2020, entitled "UE AUTONOMOUS TIMING ADVANCE," the content of which is hereby incorporated fully by reference herein into the present disclosure.

FIELD

The present disclosure generally relates to wireless communications, and more particularly, to reporting a timing advance (TA) value derived by a user equipment (UE) in a Non-Terrestrial Network (NTN) to compensate for the propagation delays in such a network.

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

5G NR is envisioned to substantially improve the capability and efficiency in Non-Terrestrial Networks (NTNs). An NTN refers to a network, or segments of a network, that uses a spaceborne vehicle for data transmission, for example, using one or more Low Earth Orbiting (LEO) satellites and one or more Geostationary Earth Orbiting (GEO) satellites. The possible reference scenarios and architecture options for NTNs may be identified in the 3rd Generation Partnership Project (3GPP) specifications. For example, in 3GPP NTN working item (WI), a 3GPP class 3 user equipment (UE) with Global Navigation Satellite System (GNSS) capability for identifying the UE's location is addressed.

In 5G NR, TA is defined as a feature for controlling the uplink signal transmission timing. The network may keep measuring the time difference between the physical uplink shared PRACH/channel (PUSCH)/physical uplink control channel (PUCCH)/sounding reference signal (SRS) reception and the subframe time and may send a TA command to the UE to update the PRACH/PUSCH/PUCCH transmission time to better align with the subframe timing at the network.

One of the primary differences between an NTN and a terrestrial cellular network is the significantly longer propagation delay between a UE that is on the ground and a satellite in the NTN. Propagation delays may result in the uplink signals from different UEs being received at the base station at significantly different times. To be able to receive multiple uplink signals at the same time, traditionally, a base station may assign different TAs to the UEs to ensure that the reception times of the signals from the different UEs are the same. A TA value may be assigned to a UE in a random access procedure (e.g., in a random access response). The amount of timing adjustment may be indicated to the UE via TA command medium access control (MAC) control element (CE). The TA command and the value of the TA would be substantially more accurate if a value of a UE-specific TA could be calculated and reported to the network by the UE or if the UE could prepare information that helps in calculation of the TA and report the prepared information to the base station.

SUMMARY

The present disclosure is directed to reporting a UE-specific TA (pre-compensation) by a UE in an NTN in order to compensate for the propagation delays in the NTN.

In a first aspect of the present disclosure a method for a UE in an NTN is provided. The method receives, from a base station (BS), an indication associated with a UE-specific TA report. The indication includes a value. The method initiates a random access (RA) procedure. Thereafter, the method determines whether to transmit the UE-specific TA report based on the value of the indication. Further, the method transmits, to the BS, the UE-specific TA report through the RA procedure after determining that the value enables transmission of the UE-specific TA report.

An implementation of the first aspect further includes forgoing transmitting, to the BS, the UE-specific TA report after determining that the value disables the transmission of the UE-specific TA report.

In another implementation of the first aspect, the indication is received, from the BS, via system information.

Another implementation of the first aspect further includes receiving, from the BS, satellite location information; and deriving UE-specific TA information, to be included in the UE-specific TA report, based on global navigation satellite system (GNSS) information generated at the UE and the received satellite location information.

In another implementation of the first aspect, the satellite location information is received, from the BS, via system information.

In another implementation of the first aspect, the UE-specific TA report is transmitted via an uplink (UL) message of the RA procedure, the UL message comprising one of a Message 3 (MSG3), Message 5 (MSG5), and Message A (MSGA).

In another implementation of the first aspect, the UE-specific TA report is transmitted by a medium access control (MAC) control element (CE) included in the UL message.

Another implementation of the first aspect further includes receiving, from the BS, satellite location information; deriving UE-specific TA information based on global navigation satellite system (GNSS) information generated at the UE and the received satellite location information; and deriving an offset used for a time window or a timer based on at least the UE-specific TA information.

Another implementation of the first aspect further includes starting an RA response window after the offset from an end of an RA preamble transmission of the RA procedure.

Another implementation of the first aspect further includes starting an RA contention resolution timer after the offset from an end of an MSG3 transmission of the RA procedure.

In a second aspect, a UE in a non-terrestrial network (NTN) is provided. The UE includes one or more non-transitory computer-readable media storing computer-executable instructions to perform measurements. The UE also includes at least one processor coupled to the one or more non-transitory computer-readable media, and configured to execute the computer-executable instructions to receive, from a base station (BS), an indication associated with a UE-specific timing advance (TA) report, the indication comprising a value; initiate a random access (RA) procedure; determine whether to transmit the UE-specific TA report based on the value of the indication; and transmit, to the BS, the UE-specific TA report through the RA procedure after determining that the value enables transmission of the UE-specific TA report.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
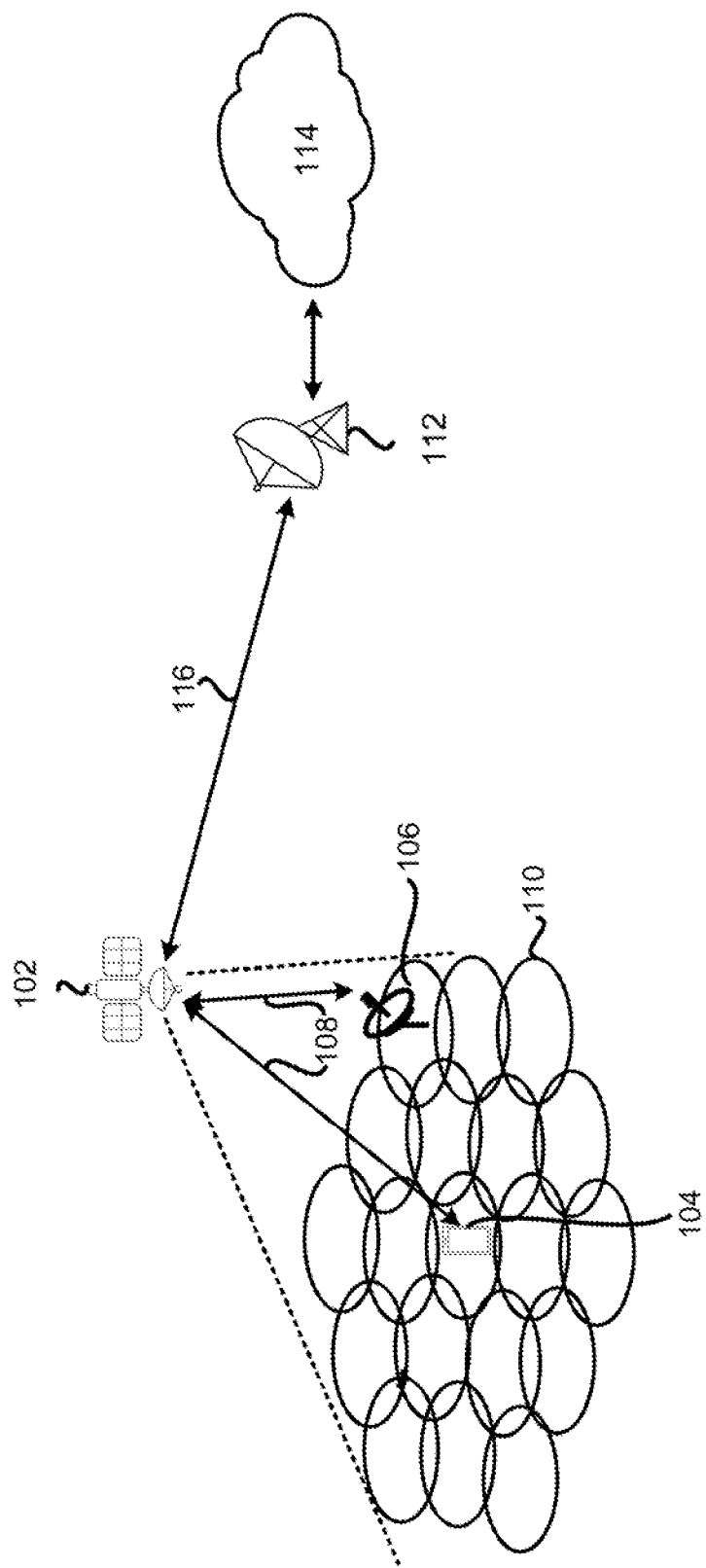
FIG. 1 is a schematic diagram illustrating wireless communication in an NTN based on a transparent payload, according to an example implementation of the present disclosure.

The acronyms in the present disclosure are defined as follows and unless otherwise specified, the acronyms have the following meanings:

Acronym Full Name
3GPP $3^{rd}$ Generation Partnership Project
5GC 5G Core
ACK Acknowledgement
AMF Access and Mobility Management Function
ARQ Automatic Repeat Request
AS Access Stratum
BCCH Broadcast Control Channel
BCH Broadcast Channel
BFR Beam Failure Recovery
BS Base Station
BSR Buffer Status Report
BWP Bandwidth Part
CA Carrier Aggregation
CBRA Contention Based Random Access
CFRA Contention Free Random Access
CG Configured Grant
CM Connection Management
CN Core Network
C-RNTI Cell Radio Network Temporary Identifier
CS-RNTI Configured Scheduling Radio Network Temporary Identifier
CSI-RS Channel State Information Reference Signal
DCI Downlink Control Information
DL Downlink
DRB Data Radio Bearer
DRX Discontinuous Reception
HARQ Hybrid Automatic Repeat Request
IE Information Element
LCH Logical Channel
LCG Logical Channel Group
LCP Logical Channel Prioritization
MAC Medium Access Control
MIB Master Information Block
MSG Message
NAS Non-Access Stratum
NG-RAN Next-Generation Radio Access Network
NR New Radio
NW Network
PCell Primary Cell
PCCH Paging Control Channel
PDCCH Physical Downlink Control Channel
PDCP Packet Data Convergence Protocol
PDU Protocol Data Unit
PHY Physical Layer
PRACH Physical Random Access Channel
PUCCH Physical Uplink Control Channel
PUSCH Physical Uplink Shared Channel
PLMN Public Land Mobile Network
QoS Quality of Service
RA Random Access
RACH Random Access Channel
RAN Radio Access Network
RB Radio Bearer
Rel Release
RLC Radio Link Control
RNA RAN-based Notification Area
RNTI Radio Network Temporary Identifier RRC Radio Resource Control
RSRP Reference Signal Receiving Power
RSRQ Reference Signal Received Quality
SCell Secondary Cell
SCG Secondary Cell Group
SCS Sub Carrier Spacing
SDAP Service Data Adaptation Protocol
SDT Small Data Transmission
SDU Service Data Unit
SFN System Frame Number
SI System Information
SIB System Information Block
SINR Signal to Interference plus Noise Ratio
SLIV Start and Length Indicator
SNPN Stand-alone Non-Public Network
SR Scheduling Request
SRB Signaling Radio Bearer
SSB Synchronization Signal Block
S-TMSI SAE-Temporary Mobile Subscriber Identity
SUL Supplementary Uplink
TA Timing Advance or Time Alignment
TAG Timing Advance Group
TB Transport Block
TS Technical Specification
UCI Uplink Control Information
UE User Equipment
UL Uplink
UPF User Plane Function The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

As described above, a Non-Terrestrial Network (NTN) refers to a network, or segments of a network, that uses a spaceborne vehicle for data transmission, for example, using one or more LEO satellites and one or more GEO satellites. One of the primary differences between an NTN and a terrestrial cellular network is the significantly longer propagation delay between a UE that is on the ground and a satellite in the NTN. In order to be able to receive multiple uplink signals at the same time, the base station may assign different timing advances to the UEs to ensure that the reception times of the signals from the different UEs at the base station are the same.

As also described above, traditionally, the timing advance (TA) value (e.g., the amount of time that should be adjusted in the UL signal transmissions) may be communicated to the UE by the network, for example, through a TA command MAC CE. The NW may communicate the (absolute) TA value to the UE via a random access procedure (e.g., in a random access response). Some of the present implementations may provide a method for the UE to prepare information that helps in the calculation of the TA value by the base station and report this information to the network. Providing the network with the UE-specific TA (pre-compensation) information (e.g., derived by the UE), as well as the UE's information (e.g., the UE's location, its direction of movement, speed, etc.) may result in the network scheduling and/or adjusting the TA value (e.g., in the TA command in a MAC CE) with substantially higher accuracy.

FIG. 1 is a schematic diagram illustrating wireless communication in an NTN based on a transparent payload, according to an example implementation of the present disclosure.

FIG. 1 illustrates a non-terrestrial network (NTN) providing access to a user equipment (UE) 104 (e.g., a mobile device, a terminal device, etc.) and/or a base station (BS) 106. The UE 104 may be served by the satellite 102 within a targeted service area. The satellite 102 may include a field of view (e.g., between the dotted lines in FIG. 1), which may depend on the onboard antenna diagram and the minimum elevation angle. The satellite 102 may generate a beam via an antenna on-board the satellite 102. The satellite 102 (e.g., or other aerial vehicles) may generate multiple beams over a given area (e.g., within the field of view of the satellite). A beam footprint 110 of a plurality of beams may be elliptically-shaped. The NTN may further include other platforms, such as, one or more satellite-gateways (sat-gateways) 112 that may connect the satellite 102 to a public data network 114. The satellite 102 may connect to the sat-gateways 112 via a feeder link (e.g., radio link) 116 while the satellite 102 may connect to the UE 104 or the BS 106 via a service link (e.g., radio link) 108.

An NTN platform may include a GEO satellite, which may be fed by one or several sat-gateways deployed across a satellite targeted coverage (e.g., regional or even continental coverage), assuming that a UE in a cell is served by only one sat-gateway. NTN platforms may also include a Non-GEO satellite, which may serve successively by one or more sat-gateways at a time. The NTN may ensure service link and feeder link continuity between the successive serving sat-gateways with sufficient time duration to proceed with mobility anchoring and hand-over. Different NTN platforms are provided in Table 1 below, however, examples of NTN platforms may not be limited to the examples provided herein.

TABLE 1

Types of NTN platforms

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit | 7000-25000 km | | 100-1000 km |
| Geostationary Earth Orbit (GEO) satellite | Above 35786 km | notional station keeping position fixed in terms of | 200-3500 km |
| UAS platform (including HAPS) | 8-50 km (20 km for HAPS) | elevation/azimuth with respect to a given earth point | 5-200 km |
| High Elliptical Orbit (HEO) satellite | 400-50000 km | Elliptical around the earth | 200-3500 km |

A satellite or an unnamed aircraft system (UAS) platform may implement either a transparent payload or a regenerative (e.g., with onboard processing) payload. The transparent payload may include radio frequency filtering, frequency conversion, and amplification. Consequently, the waveform signal repeated by the payload may stay unchanged. FIG. 1 may illustrate an example NTN scenario based on a transparent payload. The regenerative payload may include radio frequency filtering, frequency conversion, and amplification, as well as demodulation/decoding, switch and/or routing, and coding/modulation. The regenerative payload may be effectively equivalent to having all or part of a BS (e.g., a gNB) functions onboard the satellite (or a UAS platform).

Figure 2:
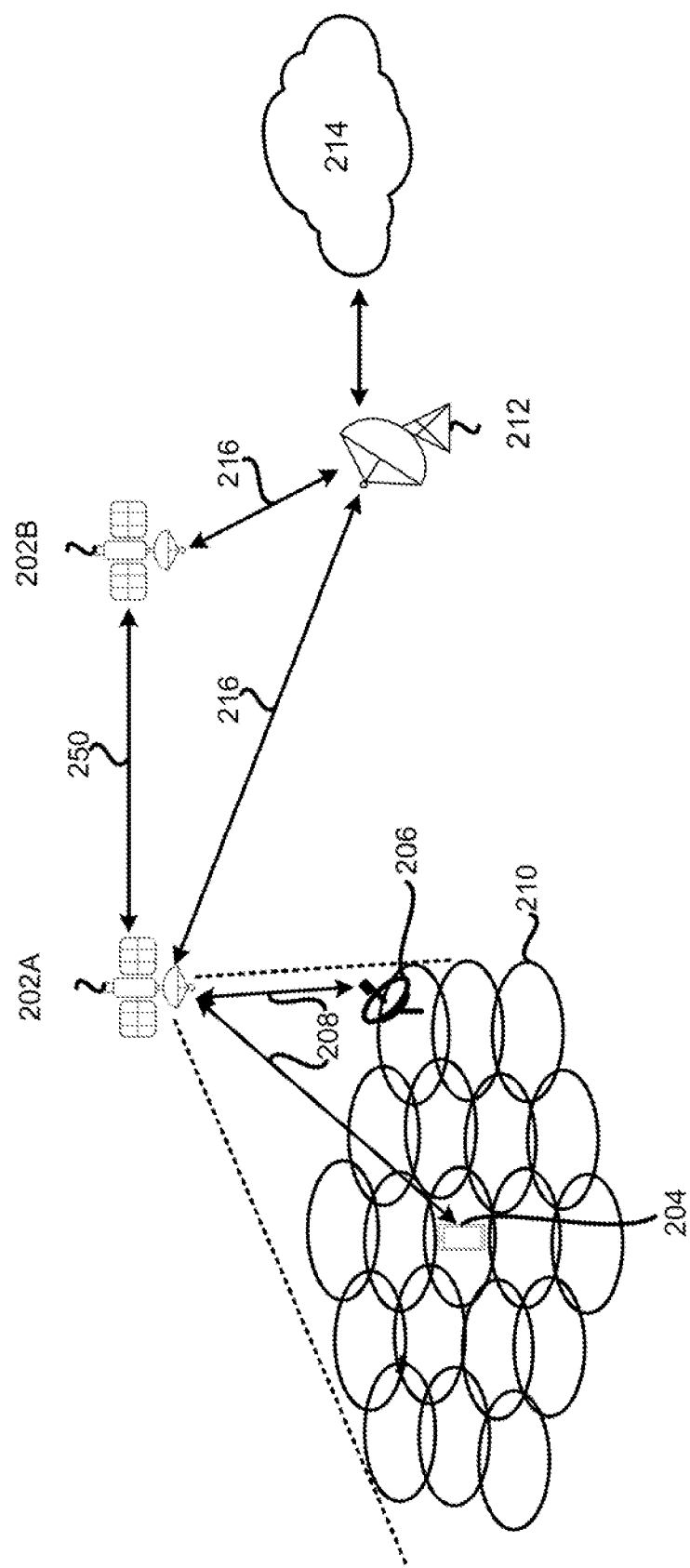
FIG. 2 is a schematic diagram illustrating wireless communication in an NTN based on a regenerative payload, according to an example implementation of the present disclosure.

FIG. 2 is a schematic diagram illustrating wireless communication in an NTN based on a regenerative payload, according to an example implementation of the present disclosure. As shown in FIG. 2, the satellite 202A may provide access to a UE 204 or a BS 206. The UE 204 may be served by the satellite 202A within a targeted service area. The satellite 202A may include a field of view (e.g., between the dotted lines in FIG. 2). The satellite 202A may generate one or more beams (not shown) via an antenna on-board the satellite 202A. The satellite 202A (e.g., or other aerial vehicles) may generate multiple beams over a given area (e.g., within the field of view of the satellite). As discussed above with reference to FIG. 1, a beam footprint 210 of a plurality of beams may be elliptically-shaped. The NTN may further include one or more satellite-gateways (sat-gateways) 212 that may connect the satellites 202A, 202B to a public data network 214. The satellites 202A, 202B may connect to the sat-gateway 212 via feeder links (e.g., radio link) 216 while the satellite 202A may connect to the UE 204 or the BS 206 directly via a service link (e.g., radio link) 208. In some implementations, one or more inter-satellite links (ISLs) 250 may optionally be implemented, specifically, in case of a constellation of satellites, which may require regenerative payloads onboard the satellites. ISL may also operate in RF frequency or optical bands. In some implementations where ISLs are not implemented, feeder links may be required.

Figure 3:
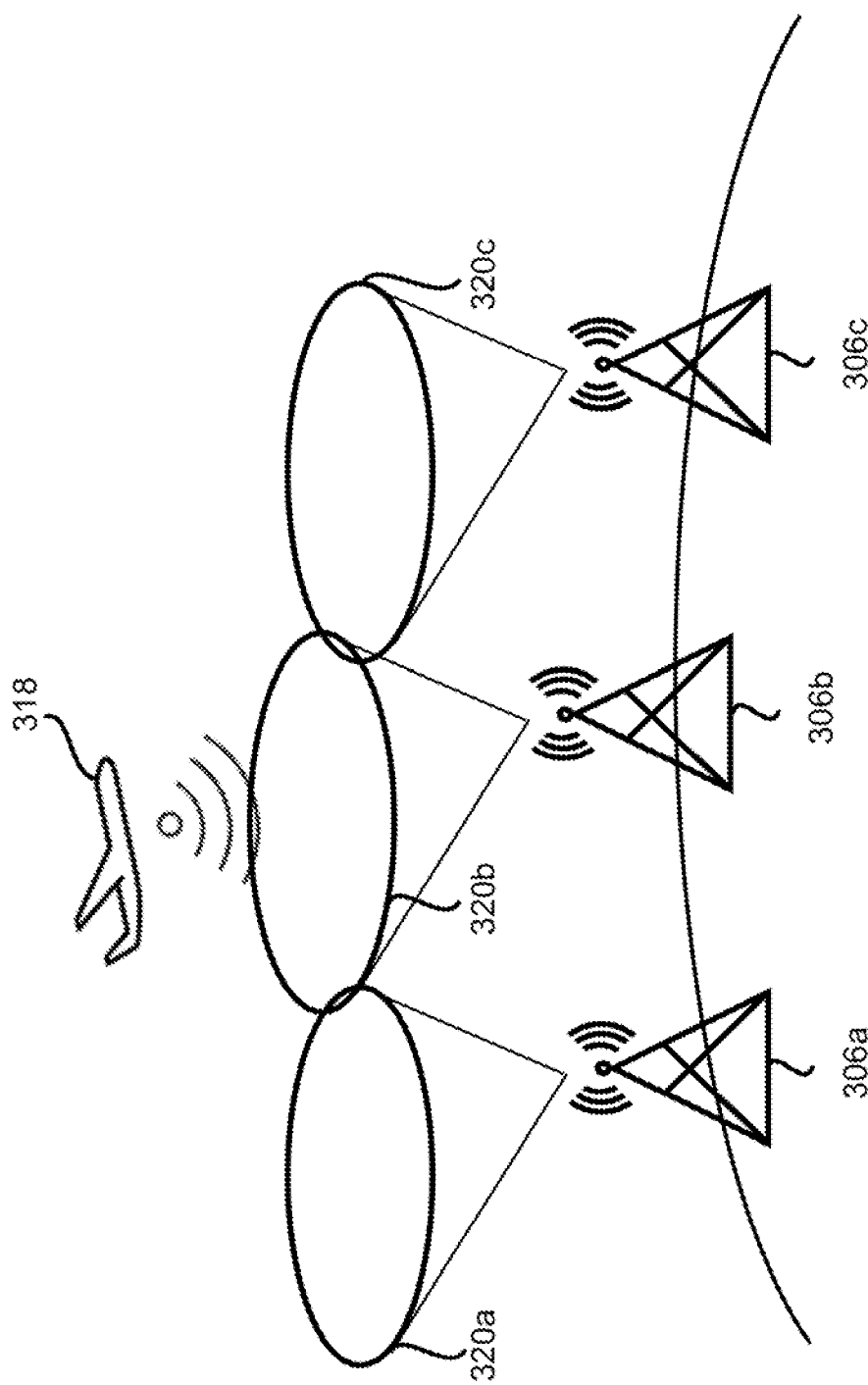
FIG. 3 is a schematic diagram illustrating wireless communication between an ATG network and a Wi-Fi onboard service, according to an example implementation of the present disclosure.

FIG. 3 is a schematic diagram illustrating wireless communication between an air-to-ground (ATG) network and a Wi-Fi onboard service, according to an example implementation of the present disclosure. In some implementations, an NTN framework may also include an ATG network, as illustrated in FIG. 3. An ATG network may be referred to as an in-flight connectivity technique where ground-based cell towers (e.g., gNBs 306a, 306b, 306c) may send signals to an aircraft's antenna(s) onboard an ATG terminal. For example, as an aircraft 318 travels into different sections of airspace, the ATG terminal onboard the aircraft 318 may automatically connect to the cell with the strongest received signal power, similar to a mobile phone on the ground. The ATG gNBs 306a, 306b, 306c may be deployed on the ground with antennas from each gNBs pointing upward to form aerial cells 320a, 320b, 320c, while the aircraft 318 may be considered a special UE with an ATG air interface or a connection between ATG gNBs 306a, 306b, 306c and the aircraft 318, whereas a connection between aircraft and passengers may be based on a Wi-Fi technology or other communication technologies. Similar to the satellite deployment discussed above, the ATG may handle extreme large cell coverage range (e.g., up to 300 km) and a UE moving at a high speed (e.g., up to 1200 km/h).

With the consideration of contributions, such as large cell coverage, long round trip time (RTT), and high Doppler, enhancements may be necessary to ensure the performance of timing (e.g., UL timing advance) and frequency synchronization for UL transmissions. To provide enhancements, one or more implementations of the present disclosure provide the following implementations to apply TA in the initial access and any subsequent TA maintenance. As described above, a BS may calculate and provide a TA value to a UE to enable the UE to align its uplink signal transmissions with its downlink signal receptions.

In some implementations, a Timing Advance (TA), which may also be referred to as a full TA, may be applied by a UE in RRC_IDLE, RRC_INACTIVE, and/or RRC_CONNECTED state with the following expression [A]:

TA=$N$_TA+UE-specific TA+Common TA+TA_offset  [A]

In the above expression, the N_TA may be defined as 0 for a PRACH and be updated based on a TA command field in an Msg2, an MsgB, and/or a TA command MAC CE. The UE-specific TA may be a UE self-estimated TA to pre-compensate for a service link delay. The UE-specific TA may be autonomously acquired by a UE using the UE's known location and satellite ephemeris. The Common TA may be a NW-controlled common TA and may include any timing offset considered necessary by the NW. The Common TA may have a value of 0. The Common TA may be broadcast by the NW to the UE. The TA_offset may be a fixed offset used to calculate the TA.

Figure 4:
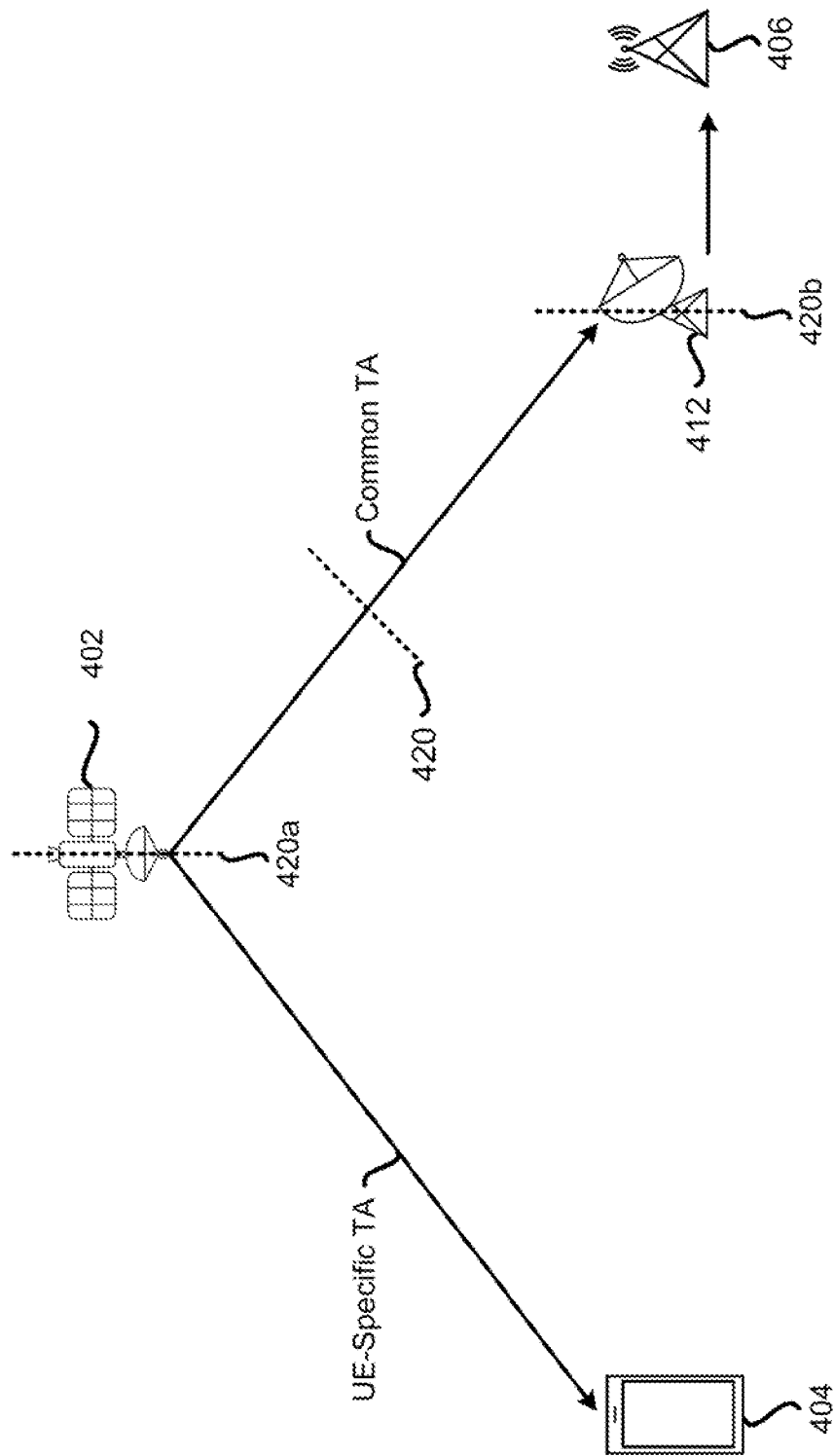
FIG. 4 is a schematic diagram illustrating acquisition of a TA in an NTN, according to an example implementation of the present disclosure.

FIG. 4 is a schematic diagram illustrating acquisition of a TA in an NTN, according to an example implementation of the present disclosure. In some implementations, with reference to FIG. 4, a NW may broadcast a real-time position of a satellite (e.g., satellite ephemeris) 402 via a SIB to a UE 404. The UE 404 may derive the current satellite position based on its last acquisition of the satellite ephemeris and some basic propagator model. The UE 404 may further acquire a propagation delay between the satellite 402 and the UE 404. That is, a UE-specific TA may be acquired by a GNSS receiver of the UE 404 and the position of the satellite 402 may be provided by the NW. On the other hand, a common TA may be defined as a common component of a propagation delay shared by all UEs within a cell coverage and correspond to an round trip delay (RTD) between a reference point (RP) 420 and the satellite 402. In some implementations, the common TA may be zero if an RP 420a is located at the satellite 402, or equal to a RTD between an NTN Gateway (GW) 412 and the satellite 402 if the RP 420b is located at the NTN GW 412. The RTD experienced between a gNB 406 and an RP may be compensated by the NW, which may be transparent to the UE 404.

In some implementations, the required TA value for UL transmission including a physical random access channel (PRACH) may be calculated by the UE without any network indication. The corresponding adjustment may be performed, either with a UE-specific TA or a full TA (e.g., comprising the UE-specific TA and a common TA), where the UE-specific TA may refer to the TA between a specific UE and a satellite (e.g., in the service link), while the common TA may refer to the TA between a gateway and a satellite (e.g., in the feeder link).

In some implementations, the full TA compensation may be at the UE, where both the alignment on the UL timing among UEs and DL and UL frame timing may be achieved at the network. In some implementations, additional requirements for a network (e.g., a base station within the network) to manage the timing offset between the DL and UL frame timing may be considered if impacts introduced by a feeder link are not compensated by the UE. In some implementations, regarding the UE-specific TA, additional indication on a single reference point may be signaled to the UEs (e.g., per beam/cell) to achieve UL timing alignment among the UEs within the coverage area of the same beam/cell. Timing offset between DL and UL frame timing at the network may also be managed by the network regardless of the satellite payload type (e.g., transparent or regenerative payload).

In some implementations, where accuracy of a TA value may be calculated at the UE side, additional TA signalling from the network to the UE for TA refinement (e.g., during an initial access, RA procedure, and/or TA maintenance) may be necessary.

In some implementations, the common TA, which may refer to the common component of propagation delay shared by all the UEs within the coverage of the same satellite beam/cell, may be broadcast by the network (e.g., per satellite beam/cell). The network may calculate such common TA assuming that at least one single reference point per satellite beam/cell may exist. In some implementations, the network may also have to indicate the TA value. To satisfy a larger coverage of NTN, extension of a value range for TA indication in RAR, either explicitly or implicitly, may be identified. In some implementations, a negative value for the TA may be supported. Moreover, the indication of timing drift rate, from the network to the UE, may also be supported in some implementations to enable the TA adjustment at the UE side.

For calculation of the common TA, for example, in the embodiments described above, a single reference point per beam may be considered as the baseline. In some implementations, multiple reference points may also be supported.

In various implementations of the present disclosure, one or more implementations are provided for the UL frequency compensation, for example, in a LEO system, with consideration on beam specific post-compensation of common frequency offset at the network side. For example, both estimation and pre-compensation of the UE-specific frequency offset may be conducted at the UE. As such, the acquisition of the TA value may be performed by utilizing DL reference signals, UE location, and/or satellite ephemeris. Additionally, the network may indicate the required frequency offset values for UL frequency compensation (e.g., at least in LEO systems) to UE in some implementations. In some such implementations, the acquisition of the frequency offset values may be performed by the network via, for example, detection of UL signals, such as preambles.

In some implementations, indication of the compensated frequency offset values by the network may also be supported, for example, when the frequency offset is conducted by the network in the uplink and/or the downlink transmission. However, an indication of the Doppler drift rate may not be necessary in some implementations.

In some implementations, a transparent or "bent-pipe" configuration may be deployed in an NTN, where a BS (e.g., a gNB) may be located on the ground while a satellite may relay signaling between the BS and a UE. Such configuration may include two components of propagation delays, the "feeder link" component and the "service link" component. The "feeder link" delay component may refer to a connection between the gNB and the satellite while the "service link" delay component may refer to a connection between the UE and the satellite. The "feeder link" delay component may be common to all UEs served by a cell, whereas the "service-link" delay component may further include a common delay and a UE-specific delay. The common delay may represent the minimum delay from the satellite to the ground (e.g., the propagation delay between the satellite and a reference point, such as a cell center, a gateway, etc.). The UE-specific delay may represent the delay between a specific UE and a reference point (e.g., a satellite) based on the UE-specific distance to the reference point.

Figure 5:
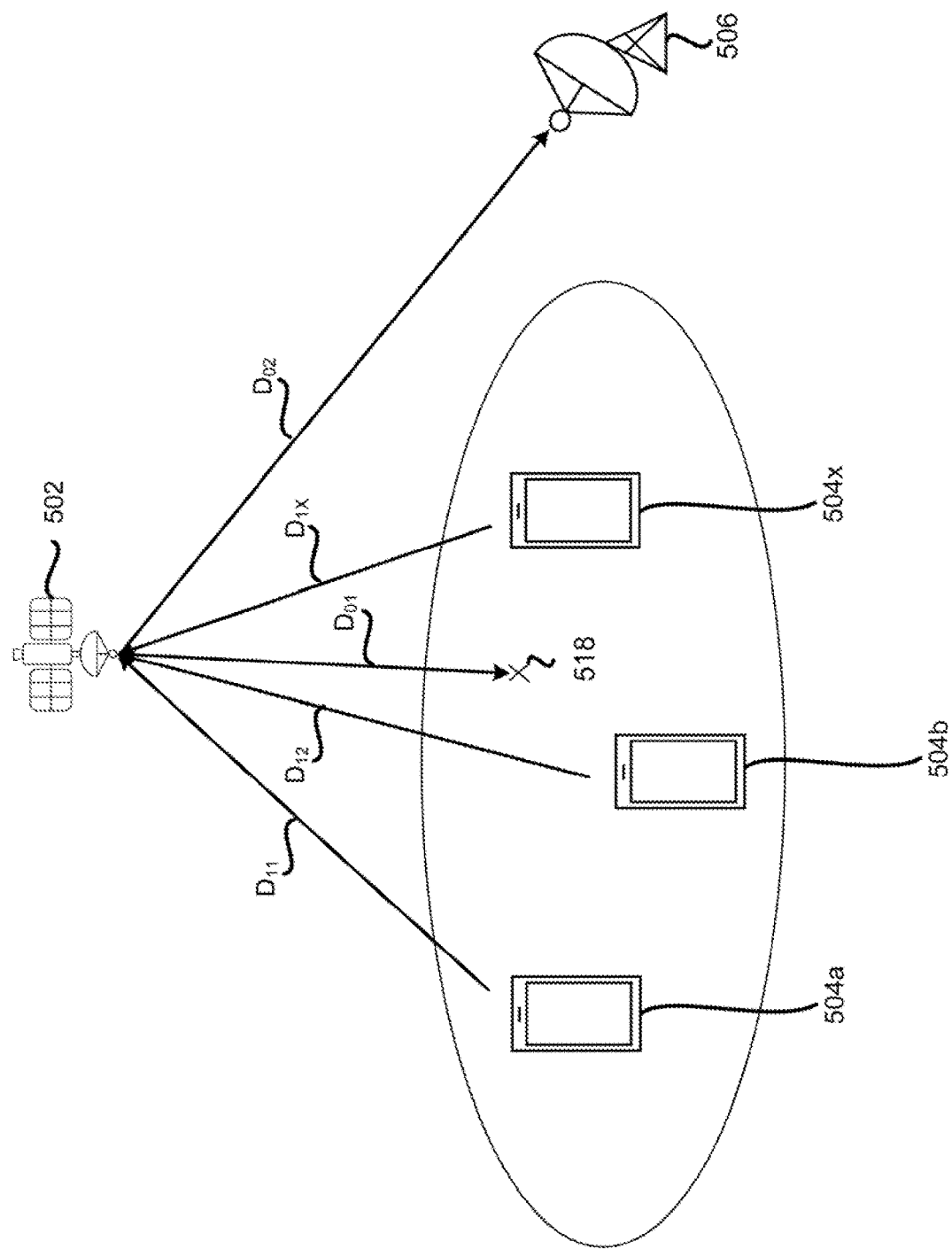
FIG. 5 is a schematic diagram illustrating acquisition of a TA based on a reference point, according to an example implementation of the present disclosure.

FIG. 5 is a schematic diagram illustrating acquisition of the TA based on a reference point, according to an example implementation of the present disclosure. As shown in FIG. 5, a transparent configuration where a BS (e.g., a gNB) 506 may be located on the ground, while a satellite 502 may relay signaling between the gNB 506 and a UE (504a, 504b, or 504x), where a single reference point 518 per beam, for example, at a cell center, may be considered as the baseline. The Full TA ($TA_{full}$), the Common TA ($TA_{com}$), and the UE-specific TA or UE-specific differential TA for $X^{th}$ UE 504x (TA504x) may be determined by the following expressions [B], [C], and [D]:

$$TA_{full} = TA_{com} + TA504_X;$$ [B]

$$TA_{com} = 2*(D_{01}+D_{02})/c;$$ [C]

$$TA504_X = 2*(D_{1x}-D_{01})/c;$$ [D]

In the above expressions, D refers to a distance, and c refers to the speed of light. For example, $D_{01}$ may refer to a distance between the reference point 518 and the satellite 502, $D_{02}$ may refer to a distance between the gNB 506 and the satellite 502, $D_{11}$ may refer to a distance between the UE 504a and the satellite 502, $D_{12}$ may refer to a distance between the UE 504b and the satellite 502, and Dix may refer to a distance between the UE 504x and the satellite 502.

In some implementations, the Full TA may be autonomously acquired by the UE or may be determined by the UE. The reference point to determine the Full TA may be determined based on different scenarios, thus may affect the definitions of the Common TA and the UE-specific TA.

Figure 6:
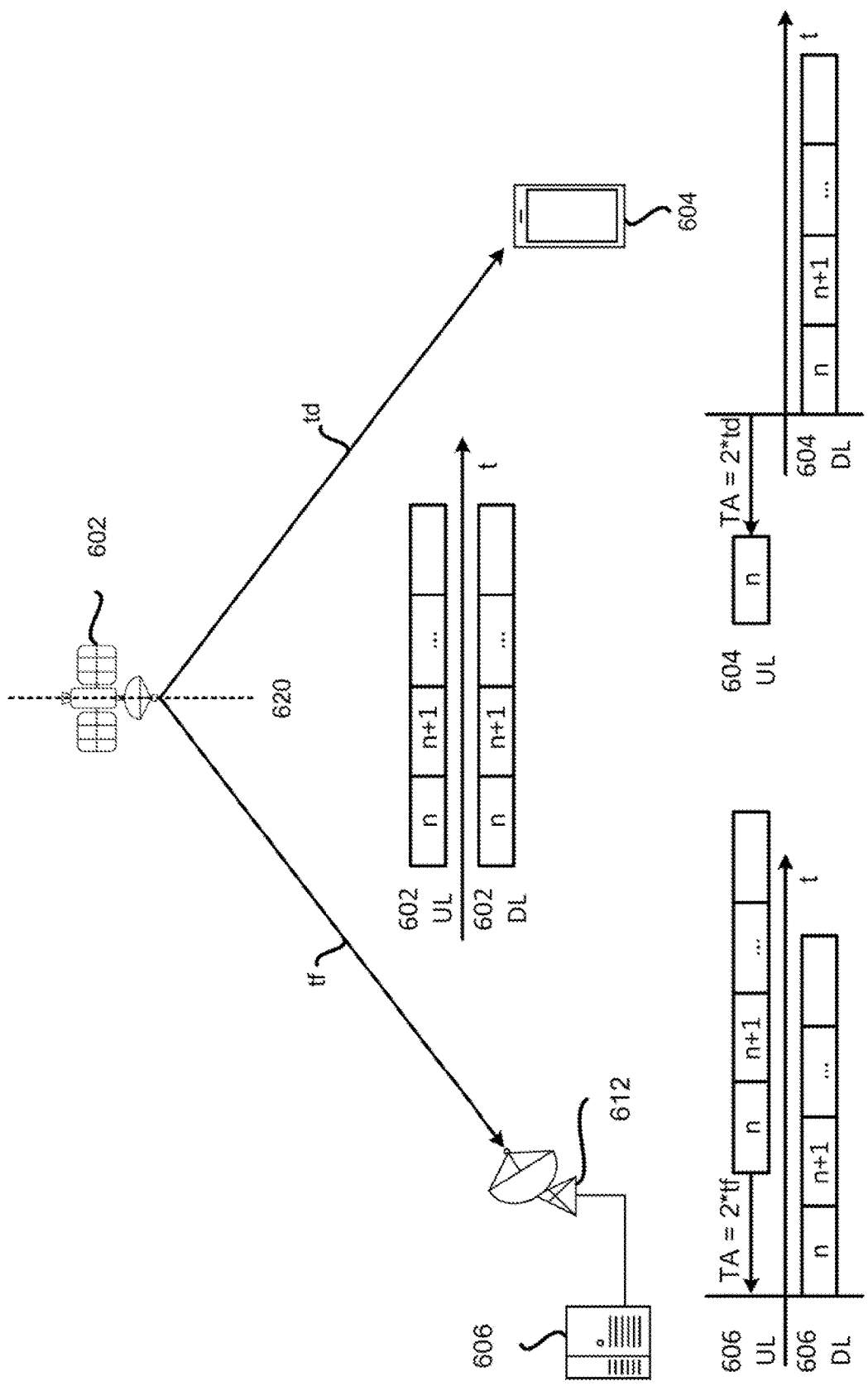
FIG. 6 is a schematic diagram illustrating acquisition of a TA based on a reference point at a satellite for UL timing synchronization, according to an example implementation of the present disclosure.

In some implementations)), a unified framework regarding the requirement of UL time and frequency synchronization may be considered. Some implementations may consider the reference point for UL timing synchronization at the satellite, which may indicate that the TA acquisition and updates may be computed according to the satellite position as the reference point (RP) for the UL timing synchronization. As a result, the UL and DL frames may align only at the satellite in some such implementations. A BS may have the capability to handle a time shift of two times the BS-Satellite common propagation delay between the UL and DL frames. Such BS-Satellite common delay may change continuously with time due to the satellite mobility. Such common delay may be broadcast within the NTN system information block (SIB) if needed. FIG. 6 illustrates the above-described principal. FIG. 6 is a schematic diagram illustrating acquisition of the TA based on a reference point at a satellite for UL timing synchronization, according to an example implementation of the present disclosure. As illustrated in FIG. 6, a reference point 620 for UL timing synchronization may be determined at a satellite 602, which may indicate that the TA acquisition and updates are computed according to the satellite position as the reference point for the UL timing synchronization. As shown in the figure, the UL frames 602 UL and DL frames 602 DL may align at the satellite 602. A gNB 606 may have the capability to handle a time shift of two times the gNB-satellite common propagation delay (tf), via gateway 612, between UL frames 606 UL and DL frames 606 DL. Similarly, a UE 604 may have the capability to handle a time shift of two times the UE-satellite propagation delay (td) between UL frames 604 UL and DL frames 604 DL. The correlation between the common propagation delay (e.g., tf) and Common TA may be represented by the following expression [E] while the correlation between the UE-specific propagation delay (e.g., td) and UE-specific TA may be represented by the following expression [F]:

$$Common\ TA = 2*tf$$ [E]

$$UE\text{-specific}\ TA = 2*td$$ [F]

In other implementations, other variations on the time reference or reference point (RP) may also be provided to achieve similar results.

Figure 7:
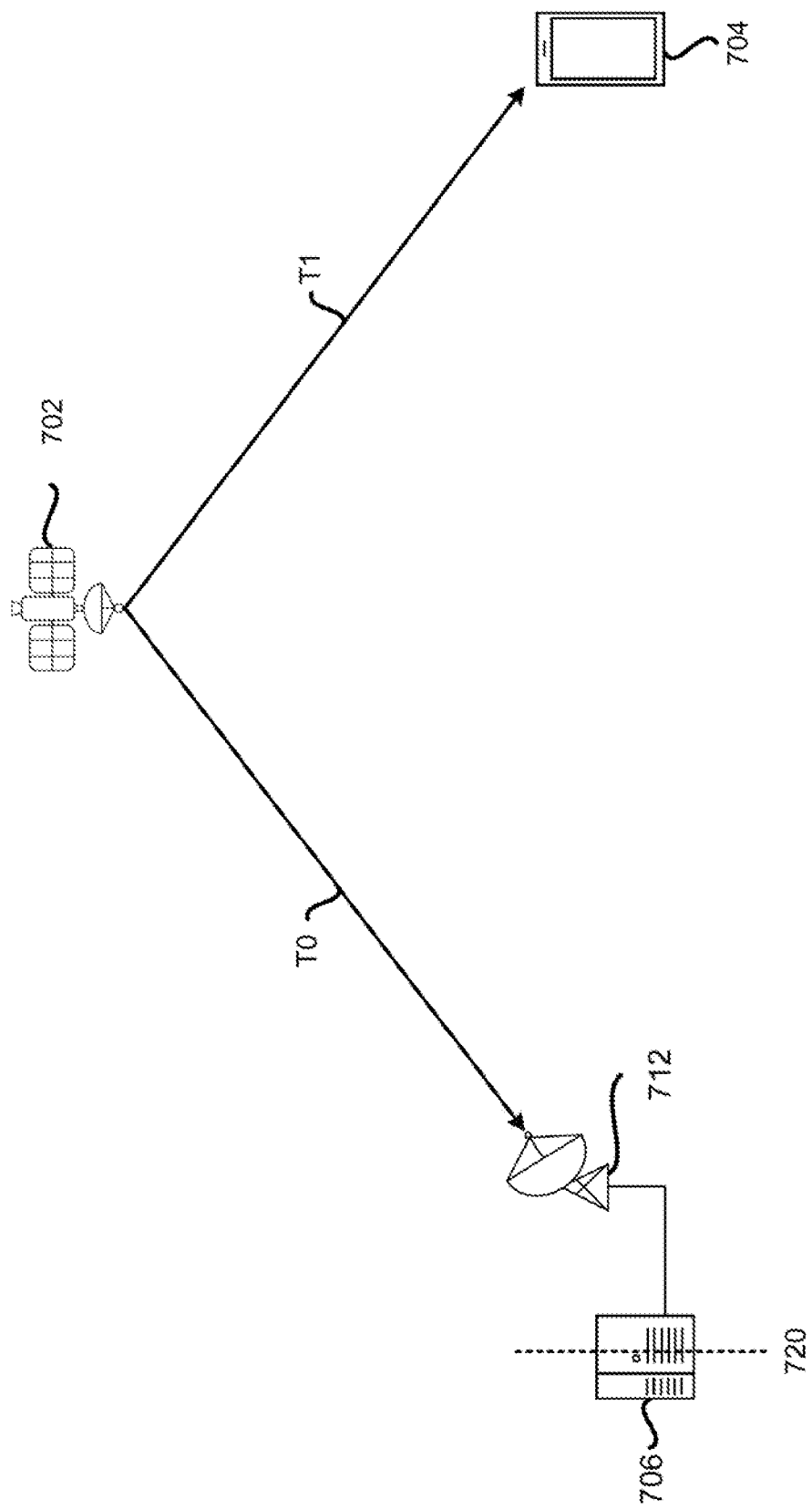
FIG. 7 is a schematic diagram illustrating acquisition of a TA based on a reference point at a base station, according to an example implementation of the present disclosure.

In some implementations, with reference to FIG. 7, an RP 720 may be located at a gNB 706. FIG. 7 is a schematic diagram illustrating acquisition of the TA based on a reference point at a base station, according to an example implementation of the present disclosure.

The initial TA acquisition (e.g., before a PRACH transmission) may be computed as a sum of two distinct contributions, which may be represented by the following expression [G]:

$$TA = UE\text{-specific}\ TA + Common\ TA = 2*T1 + 2*T0$$ [G]

where the UE-specific TA, which may correspond to a service link RTD of 2*T1, may be autonomously acquired by UE 704 via GNSS capabilities (e.g., position acquired based on GNSS) of the UE 704 and additional network indications (e.g., satellite ephemeris or timestamp). On the other hand, the Common TA, which may correspond to an RTD of 2*T0 experienced between the RP 720 and the satellite 702 (including gateway 712), may be indicated by the network. T0 is the transmission time between the satellite 702 and the gateway 712 while T1 is the transmission time between the satellite 702 and the UE 704. In some implementations, the gateway 712 and the base station 706 may be the same unit while in other implementations, the gateway 712 and the base station 706 may be separate units.

Figure 8:
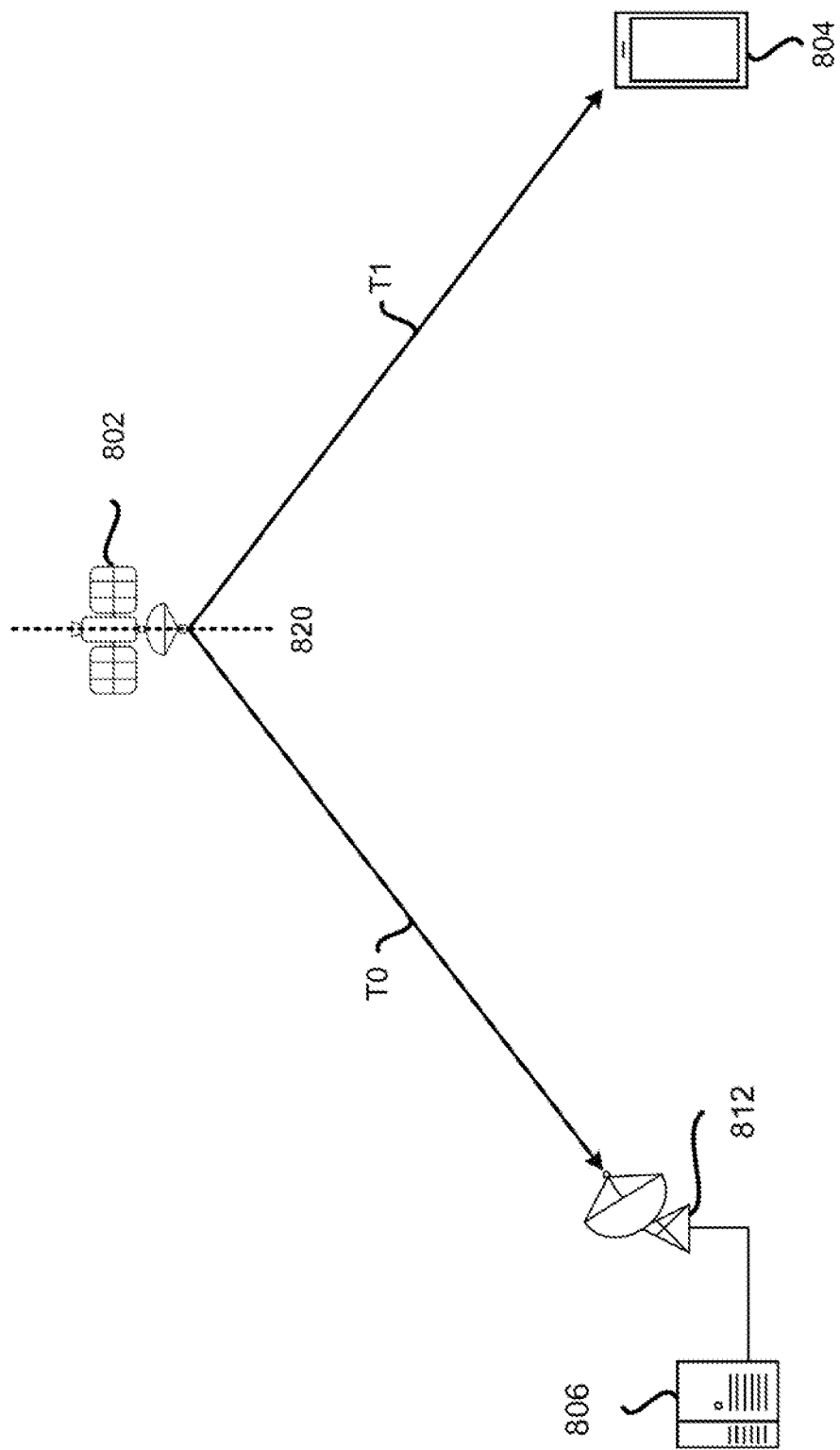
FIG. 8 is a schematic diagram illustrating acquisition of a TA based on a reference point at a satellite, according to an example implementation of the present disclosure.

In some implementations, with reference to FIG. 8, an RP 820 may be located at a satellite 802. FIG. 8 is a schematic diagram illustrating acquisition of the TA based on a reference point at a satellite, according to an example implementation of the present disclosure.

The initial TA acquisition (e.g., before a PRACH transmission) may be computed as a sum of two distinct contributions, which may be represented by the expression [G] above. The UE-specific TA, which may also correspond to a service link RTD of 2*T1, may be autonomously acquired by UE 804 via GNSS capabilities (e.g., position acquired based on GNSS) of the UE 804 and additional network indications (e.g., satellite ephemeris or timestamp). On the other hand, the Common TA, which may correspond to an RTD of 2*T0 experienced between the RP 820 and the satellite 802 (e.g., including gateway 812), may be indicated by the network. The example implementation with reference to FIG. 8 may differ from the example implementation with reference to FIG. 7 in that the Common TA, which may correspond to the RTD experienced between the RP and the satellite, may be assumed to be zero. Thus, in some such implementations, the common TA indication may not be necessary. T0 is the transmission time between the satellite 802 and the gateway 812 while T1 is the transmission time between the satellite 802 and UE 804. In some implementations, the gateway 812 and the base station 806 may be the same unit while in other implementations, the gateway 812 and the base station 806 may be separate units.

Figure 9:
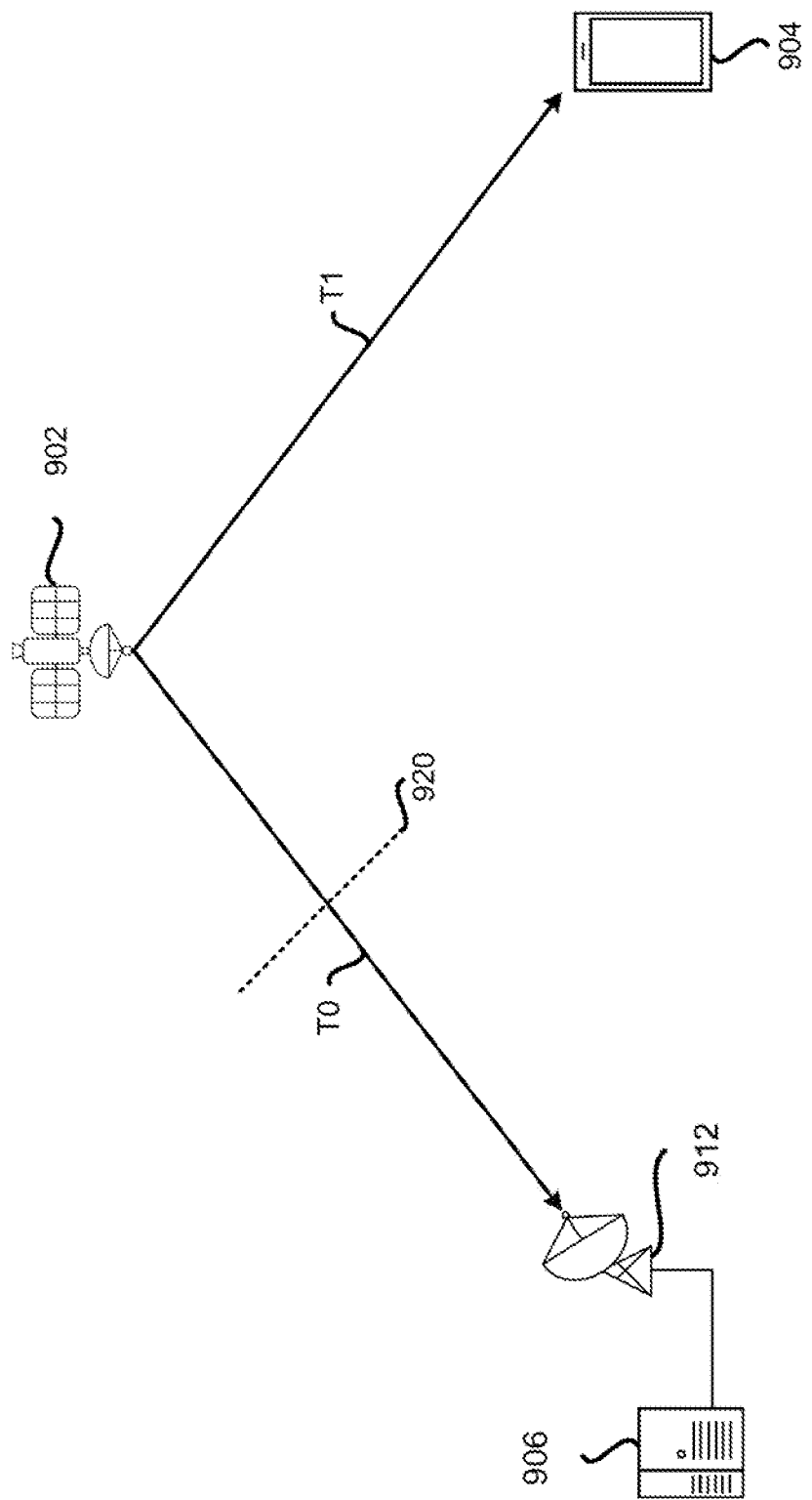
FIG. 9 is a schematic diagram illustrating acquisition of a TA based on a non-specified reference point, according to an example implementation of the present disclosure.

In some implementations, with reference to FIG. 9, an RP 920 localization may not be specified (e.g., not specified to a satellite 902 or a gNB 906) and based on the scenario. FIG. 9 is a schematic diagram illustrating acquisition of TA based on a non-specified reference point, according to an example implementation of the present disclosure.

The initial TA acquisition (e.g., before a PRACH transmission) may be computed as a sum of two distinct contributions, which may be represented by the expression [G] above. The UE-specific TA, which may also correspond to a service link RTD of 2*T1, may be autonomously acquired by UE 804 via GNSS capabilities (e.g., position acquired based on GNSS) of the UE 904 and additional network indications (e.g., satellite ephemeris or timestamp). On the other hand, the Common TA, which may correspond to an RTD of 2*T0 experienced between the RP 920 and the satellite 902 (e.g., including gateway 912), may be indicated by the network. The example implementation with reference to FIG. 9 may differ from the example implementations with reference to FIGS. 7 and 8 in that the Common TA may be either positive or negative, thus, the RP 920 may be located either on the feeder link (e.g., the connection between satellite 902 and gNB 906), as shown in FIG. 9 or on the service link (e.g., the connection between satellite 902 and UE 904) (not shown in FIG. 9). T0 is the transmission time between the satellite 902 and the gateway 912 while T1 is the transmission time between the satellite 902 and the UE 904. In some implementations, the gateway 912 and the base station 906 may be the same unit while in other implementations, the gateway 912 and the base station 906 may be separate units.

In some implementations, Common TA and UE-specific TA may have different definitions based on different scenarios. In some implementations, where TA is NW-based TA (e.g., NW broadcasts cell-specific reference TA), the Common TA may be the minimum RTT from a satellite to a reference point in a serving cell while the UE-specific TA may be the minimum RTT from a UE to a reference point in a serving cell. In other implementations, where TA is an UE-specific TA (e.g., UE estimations TA based on GNSS and ephemeris), the Common TA may be the minimum RTT from a satellite to a reference point on a gNB, a satellite, or a feeder link or a service link while the UE-specific TA may be the minimum RTT from a UE to a satellite.

In some implementations, in the uplink, a base station (e.g., a gNB) may dynamically allocate resources to the UEs, for example, via a cell radio network temporary identifier (C-RNTI) or a configured scheduling radio network temporary identifier (CS-RNTI) on a physical downlink control channel (PDCCH). A UE may monitor the PDCCH in order to find possible configured grants for the uplink transmission when its downlink reception is enabled (e.g., the UE may activity governed by the DRX when configured). When CA is configured, the same C-RNTI/CS-RNTI may apply to all serving cells. In addition, with Configured Grants, the base station may allocate the uplink resources for the initial hybrid automatic repeat request (HARQ) transmissions to the UEs.

In some implementations, two types of configured uplink grants may be configured. With Type 1 configured grant (CG), a radio resource control (RRC) signaling may directly provide the configured uplink grant (e.g., including the periodicity). With Type 2 CG, the RRC signaling may define the periodicity of the configured uplink grant, while the PDCCH addressed to the CS-RNTI may either signal and activate the configured uplink grant, or deactivate it. That is, a PDCCH addressed to the CS-RNTI may indicate that the uplink grant can be implicitly reused according to the periodicity defined by the RRC signaling, until deactivated.

Type 1 and Type 2 CGs are configured by the RRC signaling per Serving Cell and per BWP in some implementations. In some such implementations, multiple configurations may be active simultaneously, e.g., on different Serving Cells. For Type 2 CG, activation and deactivation may depend on the Serving Cells. For the same Serving Cell, the UE/MAC entity may be configured with either Type 1 or Type 2.

In some implementations, RRC may configure different parameters when the configured grant Type 1 is configured. For example, RRC may configure a cs-RNTI parameter used for retransmission; a periodicity parameter that indicates a periodicity of the configured grant Type 1; a timeDomainOffset parameter that indicates the Offset for a resource with respect to SFN=0 in time domain; a timeDomainAllocation parameter for the allocation of configured uplink grant in time domain, which may contain startSymbolAndLength (e.g., SLIV in Technical Specification 38.214); and a nrof-HARQ-Processes parameter that indicates the number of HARQ processes for configured grant.

Upon configuration of a configured grant Type 1 for a Serving Cell (e.g., by the upper layers), the UE/MAC entity may store the uplink grant provided by the upper layers, as a configured uplink grant for the indicated Serving Cell. The UE/MAC entity may also initialise or re-initialise the configured uplink grant to start in a symbol according to the timeDomainOffset and S (derived from SLIV as specified in Technical Specification (TS) 38.214) parameters, and to reoccur with periodicity.

In some implementations, a UL grant/UL resource may refer to one or more of the following:

CG (Configured Grant), where a gNB may allocate uplink resources for initial HARQ transmissions and HARQ retransmissions to UEs. Two types of configured uplink grants may be defined:

With Type 1, an RRC may directly provide the configured uplink grant (e.g., including the periodicity);

With Type 2, an RRC may define the periodicity of the configured uplink grant while a PDCCH addressed to a CS-RNTI may either signal and activate the configured uplink grant, or deactivate it (e.g., a PDCCH addressed to a CS-RNTI indicating that the uplink grant may be implicitly reused according to the periodicity defined by the RRC, until deactivated).

DG (Dynamic Grant), where a gNB may dynamically allocate resources to UEs via a C-RNTI (Cell Radio Network Temporary Identifier) on PDCCH(s) (Physical Downlink Control Channel).

RAR (Random Access Response) grant, where a UL grant provided via a Msg2/RAR and/or MsgB of the 4-step/2-step RA procedure. The UL grant may be included in a MAC payload for a RAR and/or a MsgB (e.g., a MAC RAR and/or a fallback RAR). The UL grant may be provided by a Uplink Grant field indicating the resources to be used on the uplink in TS 38.213 [4]. A size of the UL Grant field may be 27 bits. The transmission for the RAR grant may be via a Msg 3.

MsgA may include a PRACH preamble and a PUSCH transmission, known as MsgA PRACH and MsgA PUSCH, respectively.

MsgA PRACH, where MsgA PRACH preambles may be separate from the four-step RACH preambles, but may be transmitted in the same PRACH Occasions (ROs) as the preambles of four-step RACH, or in separate ROs.

MsgA PUSCH, where the PUSCH transmissions may be organized into PUSCH Occasions (POs) which span multiple symbols and PRBs with optional guard periods and guard bands between consecutive POs. Each PO may include multiple DMRS ports and DMRS sequences, with each DMRS port/DMRS sequence pair known as a PUSCH resource unit (PRU).

As described above, one of the primary differences between NTNs and terrestrial cellular networks is the significantly longer propagation delay between a UE (e.g., on the ground) and a satellite. Propagation delays may result in uplink signals from different UEs being received at a gNB at significantly different times. In order to receive multiple uplink signals simultaneously, the gNB may assign TAs to UEs to ensure that receiving times of signals from UEs are the same. A TA value may be communicated to a UE in the random access procedure, e.g., in the random access response. An amount of timing adjustment may be indicated to the UE via a TA Command MAC CE. To ensure alignment of the frame boundaries for downlink and uplink data at the gNB, the time alignment value that is used may be equal to twice the propagation delay between the satellite and the UE.

For terrestrial networks, the propagation delay and the TA are well within the duration of one OFDM symbol. In a non-terrestrial network, due to the much greater propagation delay (e.g., compared to that in a terrestrial network), the timing advance value required in NTN may be respectively much greater than that in the terrestrial networks, which implies that the frame alignment, in some implementations, before and after applying the TA may differ significantly. When a gateway pre-compensates a feeder link delay (e.g., between the gateway and a satellite where a timing reference or reference point is at the satellite), a UE may consider only a service link delay (e.g., between the UE and the satellite). Some implementations may compensate for the above-described delays through both common delay compensation and UE-specific delay compensation.

In some implementations, a UE may compensate for the Common delay, including the feeder link delay, in addition to the delay from the satellite to a reference point (e.g., the center of a beam/cell). The Common delay may be broadcast by the NTN and the UE may apply a Common TA value for timing pre-compensation. In some implementations, the UE may compensate for the UE-specific delay, including the feeder link delay, in addition to the UE-specific delay calculated by the UE via, for example, a distance from the UE to the satellite. The feeder link delay may be broadcast by the NTN and the UE may add the calculated UE-specific TA value to the Common TA value to obtain the full TA or RTT for timing pre-compensation.

In some implementations, a UE may be NTN-capable, which may mean that the UE may have GNSS capabilities. Additionally, the UE may have satellite-specific characteristics, such as location(s), direction of movement(s), and speed(s) of the satellite via ephemeris data that is received periodically (e.g., via system information (SI)). The NTN-capable UEs may calculate the propagation delay from the UE to the satellite based on the UE location(s) obtained via GNSS capabilities and satellite locations via ephemeris data. By adding the feeder link delay (e.g., the satellite to gNB delay obtained, for example, along with ephemeris data in SI) to the service link delay (e.g., the satellite to specific UE delay obtained by UE), the UE may determine the full UE-specific propagation delay to the gNB. The propagation delay calculated by the UE and/or the full UE-specific propagation delay may be used to pre-compensate the TA, which may be referred to as UE autonomous TA, or UE specific TA, in one or more implementations of the present disclosure.

The UE-specific TA, in one or more implementations, may be applied to an offset to start certain timers in the MAC layer (e.g., ra-ResponseWindow, ra-ContentionResolution-Timer, etc.).

Under the UE autonomous/specific TA, reporting the TA-related information (e.g., calculated/determined by UE) and/or UE information (e.g., UE location, the direction of movement, speed, etc.) to the NW may be beneficial for scheduling and/or adjusting the TA value (e.g., received via a TA command in RAR, and/or TA Command MAC CE) with higher accuracy. Thus, timing and/or criteria that trigger reporting of the UE-specific TA information/UE information may be necessary factors for accuracy in TA value calculation.

Figure 10:
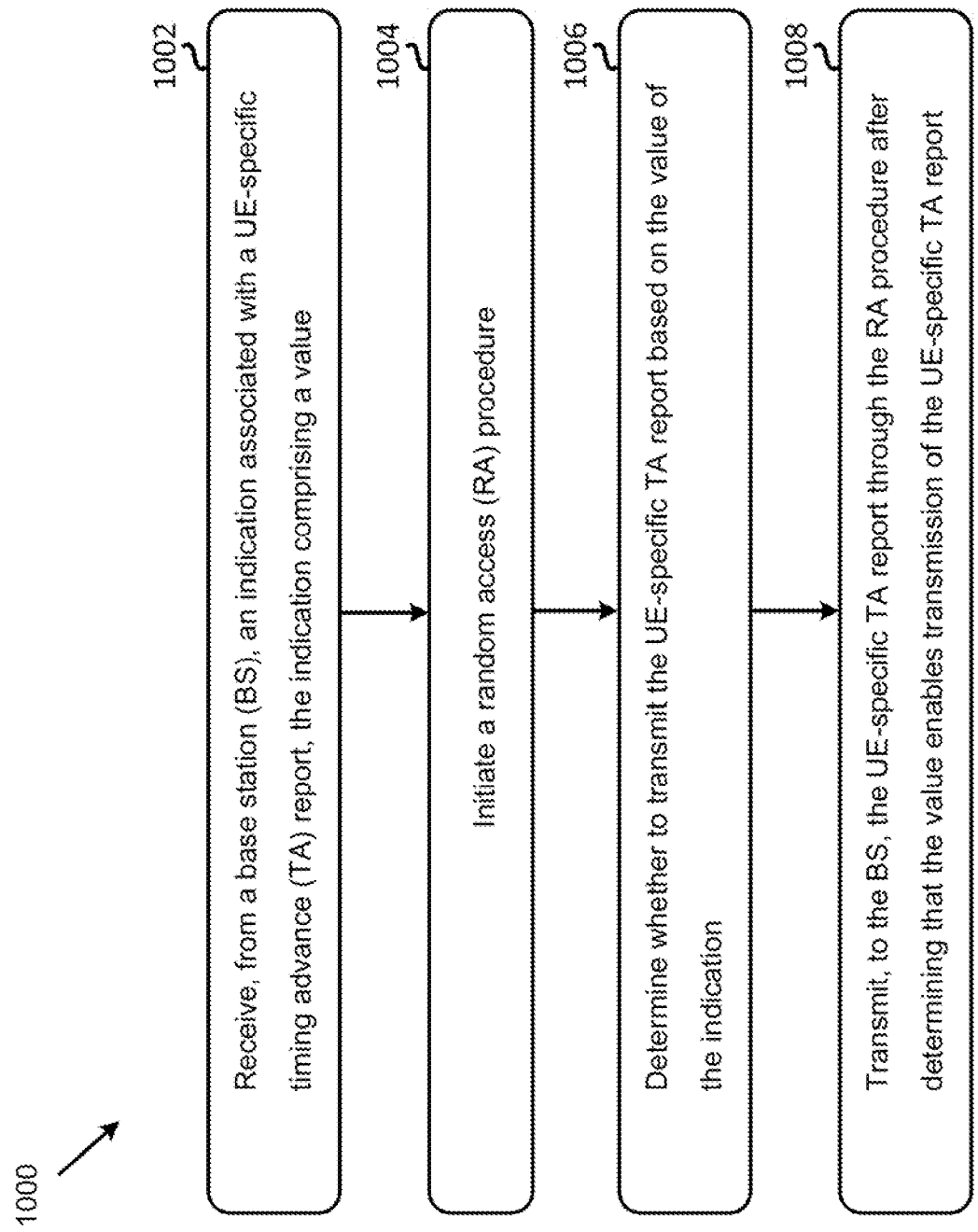
FIG. 10 is a flowchart illustrating a method for a UE to transmit a UE-specific TA report in an NTN, according to an example implementation of the present disclosure.

UE-specific TA reporting may be implemented in one or more implementations of the present disclosure, for example, with reference to FIG. 10. FIG. 10 is a flowchart illustrating a method/process 1000 for a UE to transmit a UE-specific TA report in an NTN, according to an example implementation of the present disclosure. As illustrated in FIG. 10, process 1000 may start by receiving, in action 1002, from a base station (BS), an indication associated with a UE-specific timing advance (TA) report. The indication may include a value. After receiving the indication, in action 1004, process 1000 may initiate a random access (RA) procedure. Action 1006 may include determining whether to transmit the UE-specific TA report based on the value of the indication. Action 1008 may include transmitting, to the BS, the UE-specific TA report through the RA procedure after determining that the value enables a transmission of the UE-specific TA report. In other implementations, action 1006 may be implemented before action 1004.

Figure 11:
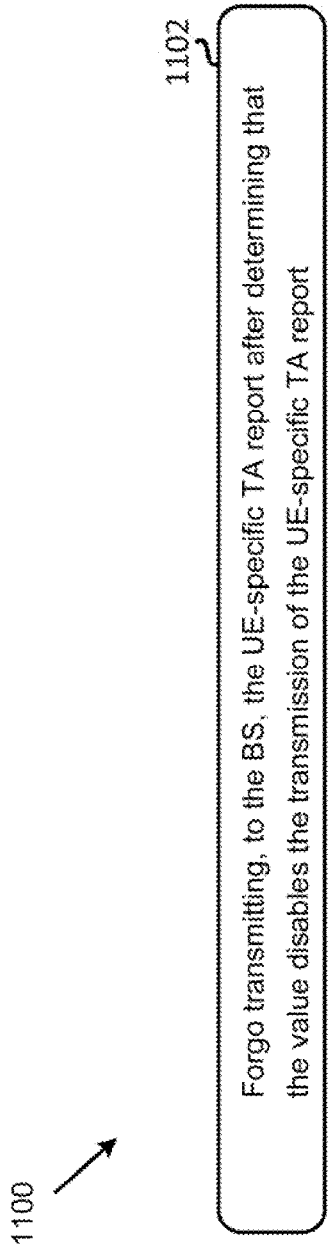
FIG. 11 is a flowchart further illustrating the method of FIG. 10, according to an example implementation of the present disclosure.

In one or more implementations of the present disclosure, actions 1002 to 1008 may further include action 1102 in FIG. 11, which is a flowchart further illustrating the method of FIG. 10, according to an example implementation of the present disclosure. As illustrated in FIG. 11, action 1102 may include forgoing transmitting, to the BS, the UE-specific TA report after determining that the value disables the transmission of the UE-specific TA report.

Figure 12:
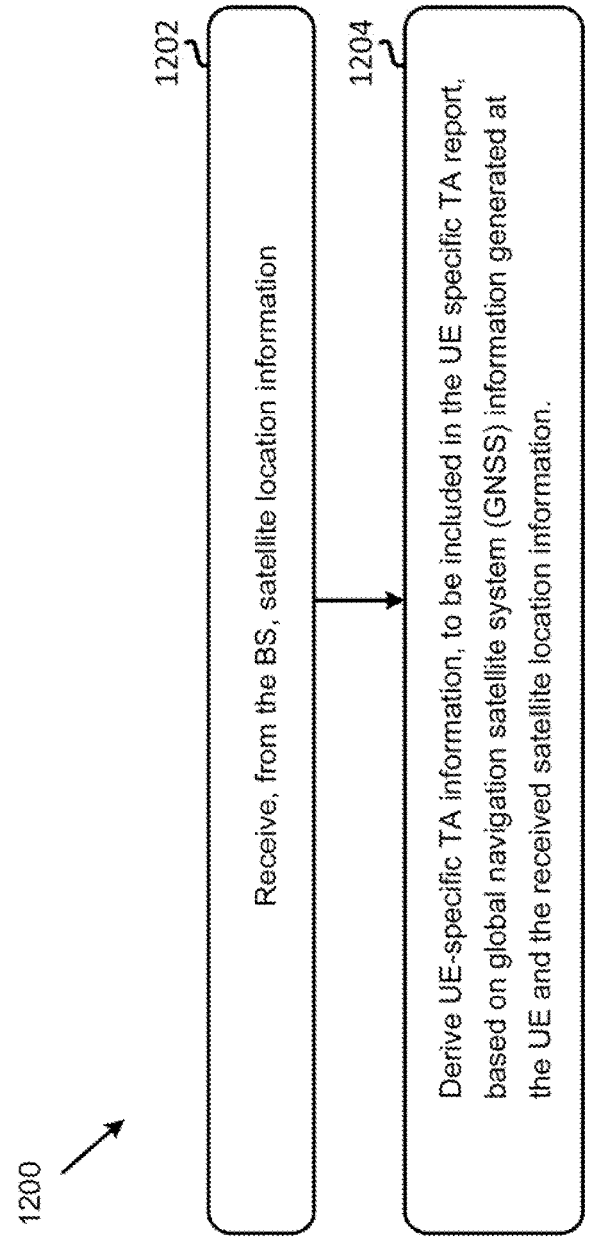
FIG. 12 is another flowchart further illustrating the method of FIG. 10, according to an example implementation of the present disclosure.

In one or more implementations of the present disclosure, actions 1002 to 1008 may further include actions 1202 and 1204 in FIG. 12, which is another flowchart further illustrating the method of FIG. 10, according to an example implementation of the present disclosure. As illustrated in FIG. 12, action 1202 may include receiving, from the BS, satellite location information. Action 1204 may include deriving UE-specific TA information, to be included in the UE-specific TA report, based on global navigation satellite system (GNSS) information generated at the UE and the received satellite location information. In some implementations, the indication may be received, from the BS, via first system information (e.g., SIB1). In some implementations, the satellite location information may be received, from the BS, via second system information different from the first system information. In some implementations, the indication and the satellite location information may be received, from the BS, via the same system information (e.g., SIB1). In some implementations, the UE-specific TA report may be transmitted via an Uplink (UL) message of the RA procedure, and the UL message may include one of a Message 3 (MSG3), a Message 5 (MSG5), and a Message A (MSGA). In some implementations, UE-specific TA report may be transmitted by a medium access control (MAC) control element (CE) included in the UL message.

Figure 13:
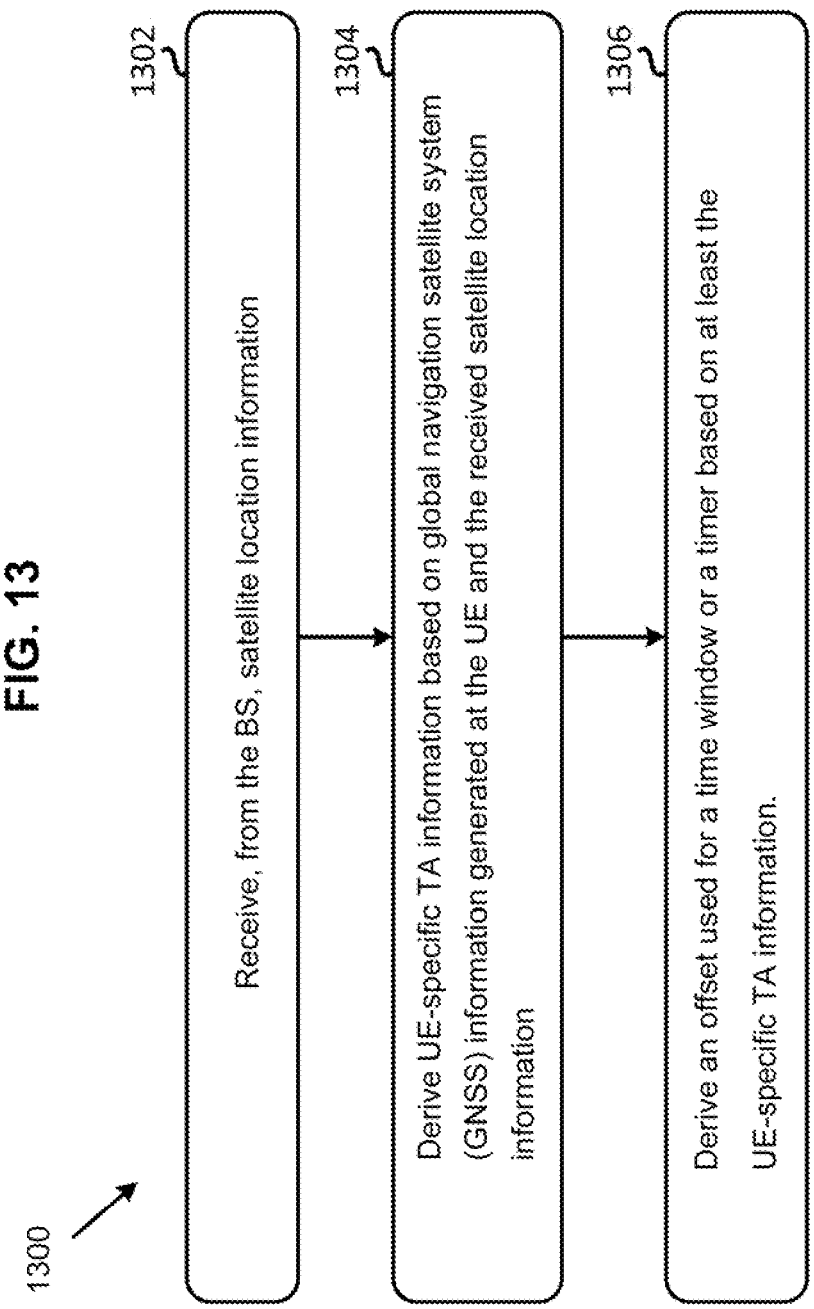
FIG. 13 is another flowchart further illustrating the method of FIG. 10, according to an example implementation of the present disclosure.

In one or more implementations of the present disclosure, actions 1002 to 1008 may further include actions 1302 to 1306 in FIG. 13, which is another flowchart further illustrating the method of FIG. 10, according to an example implementation of the present disclosure. As illustrated in FIG. 13, action 1302 may include receiving, from the BS, satellite location information. Action 1304 may include deriving UE-specific TA information based on GNSS information generated at the UE and the received satellite location information. Action 1306 may include deriving an offset used for a time window or a timer based on at least the UE-specific TA information.

Figure 14:
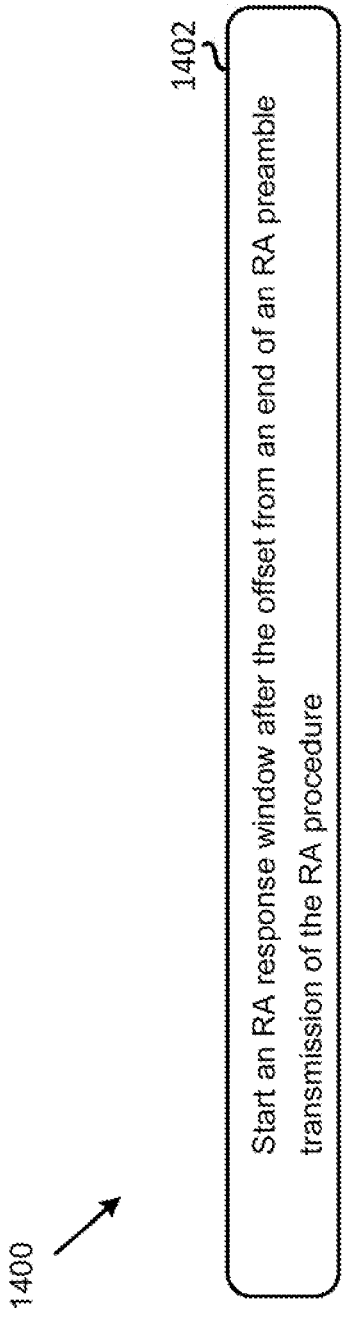
FIG. 14 is another flowchart further illustrating the method of FIG. 13, according to an example implementation of the present disclosure.

In some implementations of the present disclosure, actions 1302 to 1306 in FIG. 13 may further include action 1402 in FIG. 14, which is another flowchart further illustrating the method of FIG. 13, according to an example implementation of the present disclosure. As illustrated in FIG. 14, action 1402 may include starting an RA response window after the offset from an end of an RA preamble transmission of the RA procedure.

Figure 15:
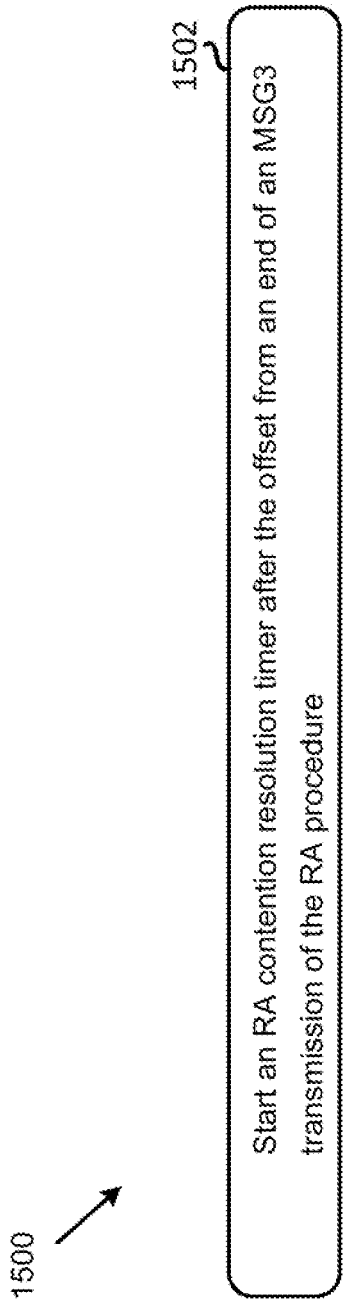
FIG. 15 is another flowchart further illustrating the method of FIG. 13, according to an example implementation of the present disclosure.

In some implementations of the present disclosure, actions 1302 to 1306 in FIG. 13 may further include action 1502 in FIG. 15, which is another flowchart further illustrating the method of FIG. 13, according to an example implementation of the present disclosure. As illustrated in FIG. 15, action 1502 may include starting an RA contention resolution timer after the offset from an end of an MSG3 transmission of the RA procedure.

In some implementations of the present disclosure, a UE may trigger reporting of UE-specific TA, generate a report of the UE-specific TA (e.g., via a MAC CE), and/or transmit the report of the UE-specific TA to a NW when or after at least one of the following condition(s) and/or a combination thereof is satisfied. For example, a UE may trigger reporting of a UE-specific TA, generate a report of the UE-specific TA (e.g., via a MAC CE), and/or transmit the report of the UE-specific TA to a NW if the UE determines to transmit the UE-specific TA report (e.g., based on the value of an indication in a system information).

In some implementations, when a UE initializes an RA procedure due to certain event(s), the UE may trigger a report of UE-specific TA/UE information, generate the report of the UE-specific TA/UE information (e.g., via a MAC CE), and/or transmit the report of the UE-specific TA/UE information to a NW. In one or more implementations, the report of the UE-specific TA/UE information may be transmitted via a Msg3 and/or a Msg A (e.g., through PUSCH). The report of the UE-specific TA/UE information may be implicitly transmitted based on a time/frequency resource of a PRACH. In some implementations, the report of the UE-specific TA/UE information may be transmitted via an Msg5. For example, the UE may receive a Message 4 (Msg4) indicating a UL grant and may then include/multiplex the report of the UE-specific TA/UE information in/with a transport block (TB) transmitted via the UL grant. More specifically, the UE may determine that the contention resolution of the RA procedure is successful and/or may determine that the RA procedure has been successfully completed when the UE receives a PDCCH addressed to a C-RNTI which contains a UL grant for a new transmission. In some implementations, the RA procedure may be a 4-step RA procedure and/or a 2-step RA procedure. In some implementations, the UE may set the RA type as a 2-step RA type and/or a 4-step RA type for the RA procedure.

In some implementations, the RA procedure may be initialized/triggered by one or more of the following events:
Initial access from RRC_IDLE;
RRC Connection Re-establishment procedure;
DL or UL data arrival during RRC_CONNECTED when UL synchronization status is "non-synchronized";
UL data arrival during RRC_CONNECTED when there are no PUCCH resources for SR available;
SR failure;
Request by RRC upon synchronous reconfiguration (e.g. handover);
Transition from RRC_INACTIVE;
To establish time alignment for a secondary TAG;
Request for Other SI;
Beam failure recovery;
Consistent UL LBT failure on SpCell.

In some implementations, when a UE receives a specific UL grant, the UE may trigger a report of UE-specific TA/UE information, generate the report of the UE-specific TA/UE information (e.g., via a MAC CE), and transmit the report of the UE-specific TA/UE information via the specific UL grant to a NW. In some implementations, the specific UL grant may be a CG, a DG, a RAR grant, and/or a MsgA PUSCH. The specific UL grant may be associated with a specific CG configuration. In some implementations, the NW may indicate to the UE to include the report of the UE-specific TA/UE information in a TB transmitted via the specific UL grant.

In some implementations, a report of UE-specific TA/UE information may be periodically triggered and/or periodically transmitted to the NW. The periodicity may be controlled by a timer (e.g., a periodic timer). The timer may be started or restarted when the report of the UE-specific TA/UE information is triggered, generated, and/or transmitted. The report of the UE-specific TA/UE information may be triggered when the timer expires. The timer may be started or restarted upon reception of a UL grant for transmission of the report of the UE-specific TA. The timer may be started or restarted upon reception of a TA command MAC CE. The timer may be started or restarted upon reception of a DL signaling (e.g., PDCCH, PDSCH). The timer may be started or restarted upon transmission of a UL signaling (e.g., PRACH, PUSCH, PUSCH). In some implementations, the periodicity may be configured by the NW (e.g., via a RRC configuration and/or a system information). In some implementations, starting or restarting the timer may be replaced by resetting the timer. In some implementations, a unit of the timer may be a symbol, a slot, a subframe, a time period (e.g., based on millisecond (ms)), a number of a periodicity, etc. In some implementations, when a UE receives a specific indication from a NW, the UE may trigger a report of UE-specific TA/UE information, generate the report of the UE-specific TA/UE information (e.g., via a MAC CE), and/or transmit the report of the UE-specific TA/UE information to a NW. Alternatively, the specific indication may be a message to trigger the UE to report UE capability/capabilities and/or UE assistance information.

In some implementations, when a UE receives a specific indication from a NW and the specific indication indicates a first value (e.g., 1 and/or enable), the UE may trigger a report of UE-specific TA/UE information, generate the report of the UE-specific TA/UE information (e.g., via a MAC CE), and/or transmit the report of the UE-specific TA/UE information to a NW.

In some implementations, when a UE receives a specific indication from a NW and the specific indication indicates a second value (e.g., 0 and/or disable), the UE may trigger a report of UE-specific TA/UE information, generate the report of the UE-specific TA/UE information (e.g., via a MAC CE), and/or transmit the report of the UE-specific TA/UE information to a NW.

In some implementations, the specific indication may indicate a UL grant. The report of the UE-specific TA/UE information may be transmitted via the UL grant. In some implementations, the specific indication may be transmitted via a PDCCH, DCI, MAC CE, and/or RRC message. In some implementations, the specific indication may be addressed to a specific radio network temporary identifier (RNTI). In some implementations, the specific indication may be transmitted on a specific time and/or frequency resource. In some implementations, the specific indication may be transmitted via a short message and/or paging message.

In some implementations, the specific indication may be transmitted via system information (e.g., SIB1). In some implementations, the specific indication may be transmitted when the UE is in a RRC_IDLE, RRC_INACTIVE, and/or RRC_CONNECTED state. In some implementations, the specific indication may be a specific RRC message, such as RRCReconfiguration (e.g., with reconfigurationWithSync IE).

In some implementations, when or after a UE receives a satellite location information (e.g., from a NW), the UE may trigger a report of UE-specific TA/UE information, generate the report of the UE-specific TA/UE information (e.g., via a MAC CE), and/or transmit the report of the UE-specific TA/UE information to the NW.

In some implementations, when or after a UE receives a satellite location information, the UE may calculate a propagation delay between the UE and the satellite. In other implementations, when a value of the propagation delay is higher than a threshold, the UE may trigger a report of UE-specific TA/UE information, generate the report of the UE-specific TA/UE information (e.g., via a MAC CE), and/or transmit the report of the UE-specific TA/UE information to a NW. In other implementations, when a value difference between a newly calculated propagation delay and the original propagation delay is higher than a threshold, the UE may trigger the report of the UE-specific TA/UE information, generate the report of the UE-specific TA/UE information (e.g., via a MAC CE), and/or transmit the report of the UE-specific TA/UE information to the NW.

In some implementations, when or after a UE receives satellite location information, the UE may calculate a UE-specific TA. In other implementations, when a value of the UE-specific TA is higher than a threshold, the UE may trigger a report of the UE-specific TA, generate the report of the UE-specific TA (e.g., via a MAC CE), and/or transmit the report of the UE-specific TA to a NW. In other implementations, when a difference between a newly calculated UE-specific TA and the original UE-specific TA is higher than a threshold, the UE may trigger the report of the UE-specific s TA, generate the report of the UE-specific TA (e.g., via a MAC CE), and/or transmit the report of the UE-specific TA to the NW.

In some implementations, the UE may determine a TA value (e.g., apply a TA command) In other implementations, when the TA value is higher than a threshold, the UE may trigger a report of UE-specific s TA/UE information, generate the report of the UE-specific s TA/UE information (e.g., via a MAC CE), and/or transmit the report of the UE-specific TA/UE information to a NW. In other implementations, when a value difference between a newly calculated TA value and the original TA value is higher than a threshold, the UE may trigger the report of the UE-specific TA/UE information, generate the report of the UE-specific TA/UE information (e.g., via a MAC CE), and/or transmit the report of the UE-specific TA/UE information to the NW.

In some implementations, satellite location information may be transmitted via a PDCCH, DCI, MAC CE, and/or RRC message. In some implementations, the satellite location information may be transmitted via a short message and/or paging message. In some implementations, the satellite location information may be transmitted via system information (e.g., via one or more SIBs). In some implementations, the satellite location information may be transmitted when the UE is in an RRC_IDLE, RRC_INACTIVE, and/or RRC_CONNECTED state.

In other implementations, when a value of a UE-specific TA (pre-compensation) is higher or lower than a configured threshold/offset, the UE may trigger a report of UE-specific TA/UE information, generate the report of the UE-specific TA/UE information (e.g., via a MAC CE), and/or transmit the report of the UE-specific TA/UE information to a NW.

In some implementations, when a value of a UE information (e.g., GNSS, UE location, the direction of movement of the UE, speed of the UE, etc.) is higher than a threshold, the UE may trigger a report of UE-specific TA/UE information/BSR, generate the report of the UE-specific TA/UE information/BSR (e.g., via a MAC CE), and/or transmit the report of the UE-specific TA/UE information to a NW. In other implementations, when a value difference between a new UE information and the original UE information is higher than a threshold, the UE may trigger the report of the UE-specific TA/UE information, generate the report of the UE-specific TA/UE information (e.g., via a MAC CE), and/or transmit the report of the UE-specific TA/UE information to the NW.

In some implementations, the UE information may be GNSS, location, the direction of movement, and/or speed, etc of the UE.

In some implementations, a UE may detect a DL channel quality based on a DL RS (e.g., SSB and/or CSI-RS), for example, based on a radio resource management (RRM) measurement, beam measurement, cell quality measurement, etc. In other implementations, when the DL channel quality is lower than a threshold, the UE may trigger a report of UE-specificTA/UE information, generate the report of the UE-specific TA/UE information (e.g., via a MAC CE), and/or transmit the report of the UE-specific TA/UE information to a NW. In other implementations, when a difference of the current DL channel quality and the previous DL channel quality is higher than a threshold, the UE may trigger the report of the UE-specific TA/UE information, generate the report of the UE-specific TA/UE information (e.g., via a MAC CE), and/or transmit the report of the UE-specific TA/UE information to the NW.

In some implementations, a UE may determine whether to trigger a report of UE-specific TA/UE information based on UE estimates and established channel estimation techniques. In some implementations, the UE may determine whether to trigger the report of the UE-specific TA/UE information based on receiving power (e.g., RSRP/RSRQ) and cell quality. In some implementations, the measurement may be an RRM measurement. In some implementations, the DL channel quality may be detected/assessed based on the RSRP, RSRQ, and/or a SINR.

In some implementations, when a TA timer expires (e.g., and/or when a TA value is not valid), a UE may trigger a report of UE-specific TA/UE information. In some implementations, the TA timer may be a specific timer for reporting UE-specific TA/UE information. The TA timer may be a specific parameter, such as the timeAlignmentTimer. The TA timer may be a TA timer used for small data transmission(s) (e.g., used in the RRC_INACTIVE state). In some implementations, the UE may initiate an RA procedure when the UE triggers the report of the UE-specific TA/UE information and the TA timer expires (e.g., and/or TA is not valid).

In some implementations, a UE may move to another cell or base station (e.g., a gNB). When the UE leaves a source cell or gNB and camps on another cell or gNB (e.g., a target cell or gNB), the UE may trigger a report of UE-specific TA/UE information. In some implementations, a UE may move to another cell when the UE receives a RRC reconfiguration (e.g., with reconfigurationWithSync IE). The UE may further initiate a RA procedure on the other cell and/or may trigger a report of UE-specific TA/UE information, generate the report of the UE-specific TA/UE information (e.g., via a MAC CE), and/or transmit the report of the UE-specific TA/UE information to a NW. In some implementations, the source cell and the target cell may be related to different TAGs.

In some implementations, if a UL transmission (e.g., via a specific UL resource) fails to transmit, for example, for a predetermined number of times, the UE may trigger a report of UE-specific TA/UE information. In some implementations, a counter may determine the number of times. In some implementations, the counter may be reset when the UE successfully transmits a UL transmission (e.g., which may include the report of the UE-specific TA/UE information).

In some implementations, when an RLC and/or a physical problem is detected, a UE may trigger a report of UE-specific TA/UE information.

In some implementations, a physical layer problem may be detected, for example: 1) when a DAPS bearer is configured, upon receiving a particular counter (e.g., N310) consecutive "out-of-sync" indications for a source SpCell from lower layers while a particular timer (e.g., T304) is running; or 2) upon receiving N310 consecutive "out-of-sync" indications for a SpCell from lower layers while neither T300, T301, T304, T311, T316, nor T319 is running.

In some implementations, an RLF may be detected: 1) upon T310 expiry in PCell, 2) upon T312 expiry in PCell; 3) upon a random access problem indication from MCG MAC while neither T300, T301, T304, T311, nor T319 is running; 4) upon an indication from MCG RLC that a maximum number of retransmissions has been reached; 5) if connected as an IAB-node, upon an BH RLF indication received on a BAP entity from a MCG; or 6) upon a consistent uplink LBT failure indication from a MCG MAC while T304 is not running.

In some implementations, a specific UL resource may be available for a (new) transmission and/or a specific UL resource may accommodate a UE-specific TA/UE information (e.g., including corresponding sub-header as a result of LCP).

In some implementations, when a UE triggers a report of UE-specific TA/UE information, the UE may determine whether there is a UL resource that is available for a (new) transmission and/or a specific UL resource may accommodate the UE-specific TA/UE information (e.g., including corresponding sub-header as a result of LCP). If a UL resource is available, the UE may instruct a multiplexing and assembly procedure to generate the report of the UE-specific TA/UE information. In some implementations, the specific UL resource may be provided by a CG, DG, RAR grant, and/or MsgA PUSCH.

In some implementations, when a UE receives a RAR grant containing a CSI request field, a value of "1" in the CSI request field may indicate transmission of a TA value on a scheduled PUSCH, and a value of "0" may indicate no transmission of the TA value. The field may be reused if the UE detects an indication (e.g., in the system information) that may indicate a request for a UE-specific TA, or if the UE camps at an NTN cell that requests a UE-specific TA, otherwise (e.g., if the UE camps on a terrestrial network (TN) cell rather than an NTN cell), the field may remain reserved under traditional UE behaviour. In some implementations, a single-bit CSI request field may be reserved, for example, due to its functionality being incomplete. Specifically, the CSI request field may be reserved for contention-based and non-contention based random access. In some implementations, a new single-bit field "UE-specific TA/UE information request" may be introduced as shown in Table 2 below.

TABLE 2

Random Access Response Grant Content field size

| RAR grant field | Number of bits |
| --- | --- |
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |
| UE-specific TA report request | 1 (e.g., a value of "1" for indicating a TA report request) |

In some implementations, any fields in RAR (e.g., Frequency hopping flag, PUSCH frequency resource allocation, PUSCH time resource allocation, MCG, TPC command for PUSCH, CSI request, ChannelAccess-CPext, etc.) may be an alternative to reuse/repurpose for reporting the UE-specific TA/UE information request.

In some implementations, the terms "UE-specific TA", "UE autonomous TA", "UE-calculated TA" and "UE precompensation TA" may be interchangeably used in some implementations of the present disclosure.

In some implementations, the UE-specific TA/UE information may be reported via RRC signaling (e.g., an RRC message), MAC signaling (e.g., a MAC CE), and/or physical (PHY) layer signaling (e.g., via a UCI). The report of the UE-specific TA/UE information may be transmitted via a PRACH, PUCCH, and/or PUSCH.

In some implementations, the report of the UE-specific TA/UE information may include one or more of, but not limited to, the following information:

UE-specific TA/UE information value/offset calculated by a UE (e.g., based on satellite-specific characteristics such as the UE location, the direction of movement of the UE, and speed of the UE, via ephemeris data)

UE-specific TA, UE autonomous TA, UE-calculated TA, and/or UE pre-compensation TA Full TA (including a UE-specific TA and a Common TA)

A TA includes N_TA, UE-specific TA, Common TA, and TA_offset (e.g., TA=N_TA+UE-specific TA+Common TA+TA_offset)

Propagation delay between a UE and a satellite

Full propagation delay (e.g., Propagation delay between a UE and a NTN network)

Common delay, representing a minimum delay from a satellite to the ground (e.g., a propagation delay between the satellite and a reference point, such as a cell center)

UE-specific delay based on a UE-specific distance to a reference point

Common delay compensation where a delay may include a feeder link delay in addition to a delay from a satellite to a reference point (e.g., a center of a beam/cell). Such delay may be broadcast by a network, and a UE may apply such value for timing pre-compensation.

UE-specific delay compensation where a delay may include a feeder link delay in addition to a UE-specific delay calculated by a UE via, for example, a distance from the UE to a satellite. The feeder link delay may be broadcast, and the UE may add the calculated UE-specific value to obtain a full RTD for timing pre-compensation UE-specific frequency offset Full frequency offset Location, the direction of movement, and/or speed, other information of a UE In some implementations, a UE may report an absolute value for UE-specific TA/UE information. Alternative, the UE may report a delta value (e.g., comparing to the previous UE-specific TA report) for the UE-specific TA/UE information.

In some implementations, the report of the UE-specific TA/UE information may be UE capability and/or UE assistance information.

In some implementations, when the report of the UE-specific TA/UE information is triggered and no UL resource is available (e.g., and/or a UL resource could not accommodate the report of the UE-specific TA/UE information), the UE may trigger a specific SR and/or trigger an RA procedure. When the report of the UE-specific TA/UE information is transmitted, the UE may cancel the triggered report of the UE-specific TA, cancel the pending SR (e.g., triggered by the report of the UE-specific TA), and/or stop the RA procedure (e.g., initiated for the report of the UE-specific TA/UE information). When the UE triggers the report of the UE-specific TA/UE information, generates the report of the UE-specific TA/UE information (e.g., via a MAC CE), and/or transmits the report of the UE-specific TA/UE information to a NW, the UE may determine the TA to be valid (e.g., start or restart the TA timer) or invalid (e.g., may determine that the TA timer expires or not running).

In some implementations, a UE may be able to derive its position and/or a reference time/frequency (e.g., based on the UE's GNSS capability and/or based on one additional information, such as serving satellite ephemeris or timestamp, signaled by the NW). The UE may compute the timing and frequency and apply a TA/frequency adjustment for the UE that is in an RRC Idle state, RRC Inactive state, and/or RRC connected state.

In other implementations, when a GNSS-assisted TA acquisition is in an RRC Idle state, RRC Inactive state, and/or RRC connected state, a UE may calculate its TA based on the following potential contributions:

The UE-specific TA may be estimated by a UE:
The UE-specific TA may be estimated by the UE based on its GNSS acquired position together with serving satellite ephemeris indicated by a NW
The UE-specific TA may be estimated by the UE based on a GNSS acquired reference time at the UE together with a reference time as indicated by the NW Random Access Procedure Two types of random access procedure are supported: 4-step RA type with MSG1 and 2-step RA type with MSGA. Both types of RA procedure support contention-based random access (CBRA) and contention-free random access (CFRA).

The UE selects the type of random access at initiation of the random access procedure based on network configuration:
when CFRA resources are not configured, an RSRP threshold is used by the UE to select between 2-step RA type and 4-step RA type;
when CFRA resources for 4-step RA type are configured, UE performs random access with 4-step RA type;
when CFRA resources for 2-step RA type are configured, UE performs random access with 2-step RA type.

The network does not configure CFRA resources for 4-step and 2-step RA types at the same time for a Bandwidth Part (BWP). CFRA with 2-step RA type is only supported for handover.

The MSG1 of the 4-step RA type consists of a preamble on PRACH. After MSG1 transmission, the UE monitors for a response from the network within a configured window. For CFRA, dedicated preamble for MSG1 transmission is assigned by the network and upon receiving random access response from the network, the UE ends the random access procedure. For CBRA, upon reception of the random access response, the UE sends MSG3 using the UL grant scheduled in the response and monitors contention resolution. If contention resolution is not successful after MSG3 (re)transmission(s), the UE goes back to MSG1 transmission.

The MSGA of the 2-step RA type includes a preamble on PRACH and a payload on PUSCH. After MSGA transmission, the UE monitors for a response from the network within a configured window. For CFRA, dedicated preamble and PUSCH resource are configured for MSGA transmission and upon receiving the network response, the UE ends the random access procedure. For CBRA, if contention resolution is successful upon receiving the network response, the UE ends the random access procedure; while if fallback indication is received in MSGB, the UE performs MSG3 transmission using the UL grant scheduled in the fallback indication and monitors contention resolution. If contention resolution is not successful after MSG3 (re)transmission(s), the UE goes back to MSGA transmission.

If the random access procedure with 2-step RA type is not completed after a number of MSGA transmissions, the UE can be configured to switch to CBRA with 4-step RA type.

For random access in a cell configured with SUL, the network can explicitly signal which carrier to use (UL or SUL). Otherwise, the UE selects the SUL carrier if and only if the measured quality of the DL is lower than a broadcast threshold. UE performs carrier selection before selecting between 2-step and 4-step RA type. The RSRP threshold for selecting between 2-step and 4-step RA type can be configured separately for UL and SUL. Once started, all uplink transmissions of the random access procedure remain on the selected carrier.

When CA is configured, random access procedure with 2-step RA type is only performed on PCell while contention resolution can be cross-scheduled by the PCell.

When CA is configured, for random access procedure with 4-step RA type, the first three steps of CBRA always occur on the PCell while contention resolution (step 4) can be cross-scheduled by the PCell. The three steps of a CFRA started on the PCell remain on the PCell. CFRA on SCell can only be initiated by the gNB to establish timing advance for a secondary TAG: the procedure is initiated by the gNB with a PDCCH order (step 0) that is sent on a scheduling cell of an activated SCell of the secondary TAG, preamble transmission (step 1) takes place on the indicated SCell, and Random Access Response (step 2) takes place on PCell.

Figure 16:
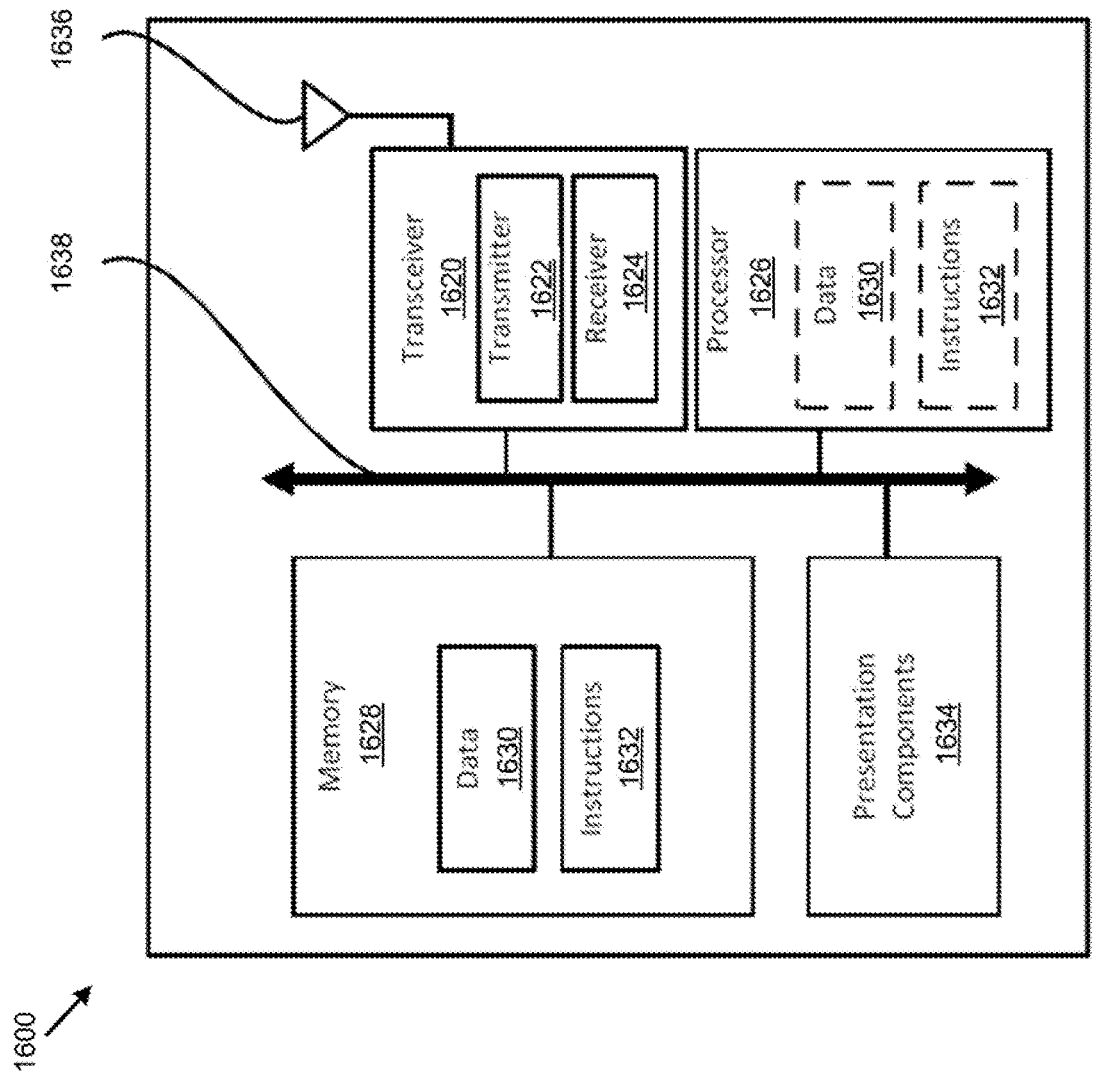
FIG. 16 is a block diagram illustrating a node for wireless communication, according to an example implementation of the present disclosure.

In some implementations of the present disclosure, the method and functions described with reference to FIGS. 1-15 may be implemented in a node. FIG. 16 is a block diagram illustrating a node 1600 for wireless communication, according to one example implementation of the present disclosure. As shown in FIG. 16, the node 1600 may include a transceiver 1620, a processor 1626, a memory 1628, one or more presentation components 1634, and at least one antenna 1636. The node 1600 may also include a Radio Frequency (RF) spectrum band module, a base station communications module, a network communications module, and a system communications management module, input/output (I/O) ports, I/O components, and a power supply (not explicitly shown in FIG. 16) in which each of the components above may be in communication with each other, directly or indirectly, over one or more buses 1638.

The transceiver 1620 may include a transmitter 1622 and a receiver 1624 configured to transmit and/or receive time and/or frequency resource partitioning information. In some implementations, the transceiver 1620 may be configured to transmit in different types of subframes and slots including, but not limited to, usable, non-usable and flexibly usable subframes and slot formats. The transceiver 1620 may be configured to receive data and control signaling.

The node 1600 may include a variety of computer-readable media. Computer-readable media may be any available media accessible by the node 1600 and include both volatile and non-volatile media, removable and non-removable media. By way of example, and not limitation, computer-readable media may include computer storage media and communication media. Computer storage media may include both volatile and non-volatile, removable and non-removable media implemented in any method or technology for storage of information, such as computer-readable instructions, data structures, program modules or other data.

Computer storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not include a propagated data signal. Communication media may embody computer-readable instructions, data structures, program modules or other data in a modulated data signal such as a carrier wave or other transport mechanism and includes any information delivery media. The term "modulated data signal" may be a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 1628 may include computer-storage media in the form of volatile and/or non-volatile memory. The memory 1628 may be removable, non-removable, or a combination thereof. Exemplary memory may include solid-state memory, hard drives, optical-disc drives, etc. As illustrated in FIG. 16, the memory 1628 may store computer-readable, computer-executable instructions 1632 (e.g., software codes) that are configured to, when executed, cause the processor 1626 to perform various functions described herein, for example, with reference to FIGS. 1 through 16. Alternatively, instructions 1632 may not be directly executable by the processor 1626 but be configured to cause the node 1600 (e.g., when compiled and executed) to perform various functions described herein.

The processor 1626 may include an intelligent hardware device, for example, a central processing unit (CPU), a microcontroller, an ASIC, etc. The processor 1626 may include memory. The processor 1626 may process data 1630 and instructions 1632 received from the memory 1628, and information through the transceiver 1620, the base band communications module, and/or the network communications module. The processor 1626 may also process information to be sent to the transceiver 1620 for transmission through the antenna 1636, and further to the network communications module for transmission to a core network.

The one or more presentation components 1634 may present data indications to a person or other device. For example, the one or more presentation components 1634 may include a display device, speaker, printing component, vibrating component, etc.

From the above description it is manifest that various techniques can be used for implementing the concepts described in the present disclosure without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A method performed by a user equipment (UE) in a non-terrestrial network (NTN), the method comprising:
receiving, from a base station (BS), system information comprising an indication, wherein the indication indicates to the UE to prepare a UE-specific timing advance (TA) report;

initiating a random access (RA) procedure;
preparing the UE-specific TA report; and
transmitting, to the BS, the UE-specific TA report through the RA procedure, wherein
preparing the UE-specific TA report comprises:
  deriving an offset used for a time window or a timer from at least TA information, and
  starting an RA response window after the offset from an end of an RA preamble transmission of the RA procedure.

2. The method of claim 1, further comprising:
receiving, from the BS, satellite location information, wherein
preparing the UE-specific TA report further comprises generating the TA information that is included in the UE-specific TA report based on global navigation satellite system (GNSS) information generated at the UE and the received satellite location information.

3. The method of claim 2, wherein the satellite location information is received, from the BS, via the system information.

4. The method of claim 1, wherein transmitting, to the BS, the UE-specific TA report comprises transmitting the UE-specific TA report via an uplink (UL) message of the RA procedure, the UL message comprising one of a Message 3 (MSG3), a Message 5 (MSG5), or a Message A (MSGA).

5. The method of claim 4, wherein the UE-specific TA report is transmitted by a medium access control (MAC) control element (CE) included in the UL message.

6. The method of claim 1, further comprising:
starting an RA contention resolution timer after the offset from an end of a Message 3 (MSG3) transmission of the RA procedure.

7. A user equipment (UE) in a non-terrestrial network (NTN), the UE comprising:
  one or more non-transitory computer-readable media storing one or more computer-executable instructions; and
  at least one processor coupled to the one or more non-transitory computer-readable media, and configured to execute the one or more computer-executable instructions to:
    receive, from a base station (BS), system information comprising an indication, wherein the indication indicates to the UE to prepare a UE-specific timing advance (TA) report;
    initiate a random access (RA) procedure;
    prepare the UE-specific TA report; and
    transmit, to the BS, the UE-specific TA report through the RA procedure, wherein preparing the UE-specific TA report comprises:
      deriving an offset used for a time window or a timer from at least TA information, and
      starting an RA response window after the offset from an end of an RA preamble transmission of the RA procedure.

8. The UE of claim 7, wherein the at least one processor is further configured to execute the one or more computer-executable instructions to:
receive, from the BS, satellite location information, wherein
preparing the UE-specific TA report further comprises generating the TA information that is included in the UE-specific TA report based on global navigation satellite system (GNSS) information generated at the UE and the received satellite location information.

9. The UE of claim 8, wherein the satellite location information is received, from the BS, via the system information.

10. The UE of claim 7, wherein transmitting, to the BS, the UE-specific TA report comprises transmitting the UE-specific TA report via an uplink (UL) message of the RA procedure, the UL message comprising one of a Message 3 (MSG3), a Message 5 (MSG5), or a Message A (MSGA).

11. The UE of claim 10, wherein the UE-specific TA report is transmitted by a medium access control (MAC) control element (CE) included in the UL message.

12. The UE of claim 7, wherein the at least one processor is further configured to execute the one or more computer-executable instructions to:
start an RA contention resolution timer after the offset from an end of a Message 3 (MSG3) transmission of the RA procedure.

\* \* \* \* \*